(12) United States Patent
Tonouchi

(10) Patent No.: US 10,038,600 B2
(45) Date of Patent: Jul. 31, 2018

(54) NETWORK INSPECTION APPARATUS, NETWORK INSPECTION METHOD, AND STORAGE MEDIUM

(71) Applicant: NEC Corporation, Minato-ku, Tokyo (JP)

(72) Inventor: Toshio Tonouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 32 days.

(21) Appl. No.: 15/325,495

(22) PCT Filed: Jul. 13, 2015

(86) PCT No.: PCT/JP2015/003534
§ 371 (c)(1),
(2) Date: Jan. 11, 2017

(87) PCT Pub. No.: WO2016/013177
PCT Pub. Date: Jan. 28, 2016

(65) Prior Publication Data
US 2017/0163491 A1    Jun. 8, 2017

(30) Foreign Application Priority Data

Jul. 23, 2014    (JP) .................................. 2014-150077

(51) Int. Cl.
*H04L 12/24* (2006.01)
*H04L 12/26* (2006.01)
(Continued)

(52) U.S. Cl.
CPC .............. *H04L 41/12* (2013.01); *H04L 43/10* (2013.01); *H04L 43/18* (2013.01); *H04L 67/2842* (2013.01)

(58) Field of Classification Search
None
See application file for complete search history.

(56) References Cited

U.S. PATENT DOCUMENTS

2009/0262735 A1* 10/2009 Shiraki ............... H04L 63/0227
370/389
2014/0223564 A1* 8/2014 Joo ..................... H04L 63/1416
726/23
(Continued)

OTHER PUBLICATIONS

Peyman Kazemian, George Varghese, Nick McKeown, "Header Space Analysis: Static Checking for Networks", NSDI'12 Proceedings of the 9th USENIX Conference on Networked Systems Design and Implementation, Apr. 25, 2012, pp. 1-14, URL: https://www.usenix.org/node/162856.
(Continued)

*Primary Examiner* — Duc T Duong

(57) ABSTRACT

Provided is an apparatus including: inspection target network information acquisition unit that acquires a transfer rule at a switch and physical network topology information about an inspection target network; backtrace function generation unit that generates, based on the transfer rule, a backtrace function that calculates a packet pattern of a packet being input to a port of a switch; physical link path acquisition unit that acquires, based on the physical network topology information and the transfer rule, a physical link path representing a series of ports from an incoming port to an outgoing port; backtrace function application unit that calculates a packet pattern at the incoming port of a packet that reaches the outgoing port, by sequentially applying the backtrace function with using a packet pattern cache storing the packet pattern at an intermediate port in the physical link path; and inspection result output unit that provides a processing result.

5 Claims, 15 Drawing Sheets

(51) Int. Cl.
*H04L 12/701* (2013.01)
*H04L 29/04* (2006.01)
*H04L 29/08* (2006.01)

(56) References Cited

U.S. PATENT DOCUMENTS

| | | | | |
|---|---|---|---|---|
| 2015/0244617 A1* | 8/2015 | Nakil | ................. | G06F 9/45558 709/224 |
| 2017/0237659 A1* | 8/2017 | Birrittella | ............. | H04L 45/745 370/392 |
| 2017/0237664 A1* | 8/2017 | Jackson | ............. | H04L 45/7453 370/392 |
| 2017/0237671 A1* | 8/2017 | Rimmer | ............. | H04L 47/2425 370/235 |

OTHER PUBLICATIONS

Toshio Tonouchi, Satoshi Yamazaki, Yutaka Yakuwa, Nobuyuki Tomizawa, "A fast method of verifying network routing with back-trace header space analysis" Integrated Network Management (IM), 2015 IFIP/IEEE International Symposium, May 11, 2015.
International Search Report for PCT Application No. PCT/JP2015/003534, dated Sep. 15, 2016.
English translation of Written opinion for PCT Application No. PCT/JP2015/003534.

* cited by examiner

Fig. 8 sw6:
in_port = 1, mac_da=$m_8$, vlan=3 → out_port=3
in_port = 1, mac_da=$m_7$, vlan=2 → out_port=3
in_port = 1, mac_da=$m_6$, vlan=3 → out_port=2
in_port = 1, mac_da=$m_5$, vlan=2 → out_port=2
......

sw4:
in_port = 1, ip_da=$a_8$ → mac_da=$m_8$, out_port=2
in_port = 1, ip_da=$a_7$ → mac_da=$m_7$, out_port=2
in_port = 1, ip_da=$a_6$ → mac_da=$m_6$, out_port=2
in_port = 1, ip_da=$a_5$ → mac_da=$m_5$, out_port=2
......

sw5:
in_port=2, mac_da=$m_9$ → out_port=1
......

NETWORK INSPECTION APPARATUS, NETWORK INSPECTION METHOD, AND STORAGE MEDIUM

This application is a National Stage Entry of PCT/JP2015/003534 filed on Jul. 13, 2015, which claims priority from Japanese Patent Application 2014-150077 filed on Jul. 23, 2014, the contents of all of which are incorporated herein by reference, in their entirety.

TECHNICAL FIELD

The present invention relates to a technology of inspecting specifications and configurations of a network.

BACKGROUND ART

Technologies for inspecting the specifications and configurations of a network are known. As an example of such technologies, for example, NPL 1 mentions a technique known as HSA (Header Space Analysis). In the HSA, a packet header is regarded as a bit series of "L" bits. Each packet is regarded as a certain point in an L-dimension space Π. And it is regarded that a packet is transferred from a certain point to another point in that space Π. Furthermore, a transfer function "$\phi$: $(\Pi \times P) \rightarrow Power(\Pi \times E)$" which indicates a packet transfer rule is created for each switch apparatus. Here, "X×Y" represents a set of direct products of "X" and "Y". "Power(X)" represents a power set of "X".

Here, "P" represents a set of physical switch ports in the network. Hereinafter, a physical switch port is also mentioned simply as port. It is assumed that, in the network, a port is uniquely identified.

"E" is a set of flow entries in the network. A flow entry is constituted by information that represents an input port, a matching pattern, an action, and an output port. Each switch apparatus includes a flow entry. When the header of a packet from the input port matches the matching pattern, the switch apparatus rewrites the header on the basis of the action in case the action is defined, and transfers the packet to the output port. Hereinafter, the pattern of a packet header is also mentioned as packet pattern.

The transfer function $\phi(\pi, p)=\{(\pi', e)\}$ indicates that when a packet having a packet pattern "$\pi$" is input to a certain port "p", the packet pattern matches a flow entry "e" and the packet header thereof becomes "$\pi'$". The input to the transfer function "$\phi$" is a pair of the packet pattern of an input packet and the input port of the packet. Because there may be a plurality of flow entries, for one packet, for copying and transferring the packet, the outputs from the transfer function "$\phi$" are a set of pairs of the packet pattern of an output packet and a flow entry being matched to the packet.

In HSA, a transfer path of a packet is determined by transitively applying a pair of the transfer function "$\phi$" and a connection function σ: P→P that represents a port connection relation between physical switches. And, by transitively applying transfer functions "$\phi$" according to the transfer path of the packet, a packet pattern of the packet is determined at a terminating end switch port. HSA traces the path reversely from the determined packet pattern at the terminating end switch port to a starting end switch port, sequentially applying inverse functions $\phi_e^{-1}$: Π→Π of the transfer functions. Therefore, HSA can determine what packet pattern of a header is set to a packet that reaches the terminating end switch port from the starting end switch port includes. In the above, "e" is a flow entry that is applied when the transfer function is applied. That is, in the case where the transfer function is $\phi(\pi, p)=\{(\pi', e)\}$, $\phi_e^{-1}(\pi')=\pi''$ indicates that the input packet pattern is narrowed down from "$\pi$" to "$\pi''$" by re-applying the flow entries in the backward direction.

In the below, a port that is connected to an external network in view of the entire network is referred to as endpoint switch port or endpoint. An input packet that is input to an endpoint is referred to as "incoming packet" and an output packet that is output from an endpoint is referred to as outgoing packet. An endpoint to which an incoming packet is input is referred to as incoming port, and an endpoint from which an outgoing packet is output is referred to as outgoing port. The packet pattern of an incoming packet is referred to as incoming packet pattern, and the packet pattern of an outgoing packet is referred to as outgoing packet pattern.

With regard to any given pair of an incoming port and an outgoing port, by calculating the incoming packet pattern thereof, a network manager can inspect the reaching capability and the isolation property. Here, the reaching capability means that an assumed packet pattern can reach an outgoing port from an incoming port. The isolation property means that an unexpected packet pattern cannot arrive at an outgoing port from an incoming port.

CITATION LIST

Non-Patent Literature

[NPL1] Peyman Kazemian, George Varghese, Nick McKeown, "Header Space Analysis: Static Checking For Networks", NSDI'12 Proceedings of the 9th USENIX Conference on Networked Systems Design and Implementation, 2012, pp. 9-22

SUMMARY OF INVENTION

Technical Problem

However, the related technology mentioned in NPL 1 has a problem that the technology requires a processing time to determine incoming packet patterns for all the pairs of endpoints in the network, when the size of a network becomes large.

A reason is that it is required to transitively apply the transfer functions with respect to the paths of all the combinations of endpoint switch ports existing in the network. In the case where the size of the network is assumed, for example, as the number of switches in the network, the number of endpoints in the network and the diameter of the network are approximated as being proportionate to the size of the network. In the case of HSA, first, the transfer functions are applied from the starting endpoint to the terminating endpoint (forward process), and then the transfer inverse functions are applied by following the path so as to go upstream from the terminating endpoint to the starting endpoint (backward process). At this time, the number of times that the transfer inverse function is applied is proportional to the size obtained by multiplying the combinations of endpoints (i.e., the second power of the size of the network) by the diameter of the network (proportional to the size of the network), and is therefore proportional to the third power of the size of the network.

The present invention has been conceived so as to solve the problem, and an object thereof is to provide a technology that reduces the processing time for calculating an incoming packet pattern for a network.

Solution to Problem

To achieve the object, a network inspection apparatus according to the present invention includes: a processing circuitry and a memory. That is the processing circuitry is configured to acquire a transfer rule for a packet at each switch in an inspection target network and physical network topology information about the inspection target network; generate, based on the transfer rule, a backtrace function that calculates backward, from a packet pattern of a packet that is output from a port of the switch, a packet pattern of a packet that is input to a port, being corresponding to the port from which a packet is output, of the switch; acquire, based on the physical network topology information and the transfer rule, a physical link path that represents a series of ports that links an incoming port of the switch to an outgoing port of the switch, the incoming port being a port of the switch through which a packet being transferred from an external network flows into the inspection target network, the outgoing port being a port of the switch from which a packet being transferred from the inspection target network to an external network flows out; calculate a packet pattern at the incoming port of a packet that reaches the outgoing port, by sequentially applying the backtrace function from the outgoing port toward the incoming port, while using a packet pattern cache that stores, in the memory, a packet pattern at an intermediate port on the physical link path of the packet that reaches the outgoing port from the intermediate port; and provide the packet pattern at the incoming port being calculated.

A network inspection method according to the present invention includes: acquiring a transfer rule regarding a packet at each switch in an inspection target network and physical network topology information about the inspection target network; generating, based on the transfer rule, a backtrace function that calculates backward, from a packet pattern of a packet that is output from a port of the switch, a packet pattern of a packet that is input to a port, corresponding to the port from which a packet is output, of the switch; acquiring, based on the physical network topology information and the transfer rule, a physical link path that represents a series of ports that link an incoming port of the switch to an outgoing port of the switch, the incoming port being a port of the switch through which a packet being transferred from an external network flows into the inspection target network, the outgoing port being a port of the switch from which a packet being transferred from the inspection target network to an external network flows out; calculating a packet pattern at the incoming port of a packet that reaches the outgoing port, by sequentially applying the backtrace function from the outgoing port toward the incoming port while using a packet pattern cache that stores a packet pattern at an intermediate port on the physical link path of the packet that reaches the outgoing port from the intermediate port; and providing the packet pattern at the incoming port of the packet that reaches the outgoing port.

A non-transitory computer readable storage medium according to the present invention stores a network inspection program that causes a computer apparatus to execute: processing for acquiring a transfer rule regarding a packet at each switch in an inspection target network and physical network topology information about the inspection target network; processing for generating, based on the transfer rule, a backtrace function that calculates backward, from a packet pattern of a packet that is output from a port of the switch, a packet pattern of a packet that is input to a port corresponding to the port from which a packet is output, of the switch; processing for acquiring, based on the physical network topology information and the transfer rule, a physical link path that represents a series of ports that links an incoming port of the switch to an outgoing port of the switch, the incoming port being a port of the switch through which a packet being transferred from an external network flows into the inspection target network, the outgoing port being a port of a switch from which a packet being transferred from the inspection target network to an external flows out; processing for calculating a packet pattern at the incoming port of a packet that reaches the outgoing port, by sequentially applying the backtrace function from the outgoing port toward the incoming port while using a packet pattern cache that stores a packet pattern at an intermediate port on the physical link path of the packet that reaches the outgoing port from the intermediate port; and processing for providing the packet pattern at the incoming port being calculated.

Advantageous Effects of Invention

The present invention can provide a technology that reduces the processing time for calculating an incoming packet pattern for a network.

BRIEF DESCRIPTION OF DRAWINGS

FIG. 8 is a diagram showing an example of flow entries in the second example embodiment of the present invention.

DESCRIPTION OF EMBODIMENTS

Hereinafter, example embodiments of the present invention will be described in detail with reference to the drawings.

First Example Embodiment

Figure 1:
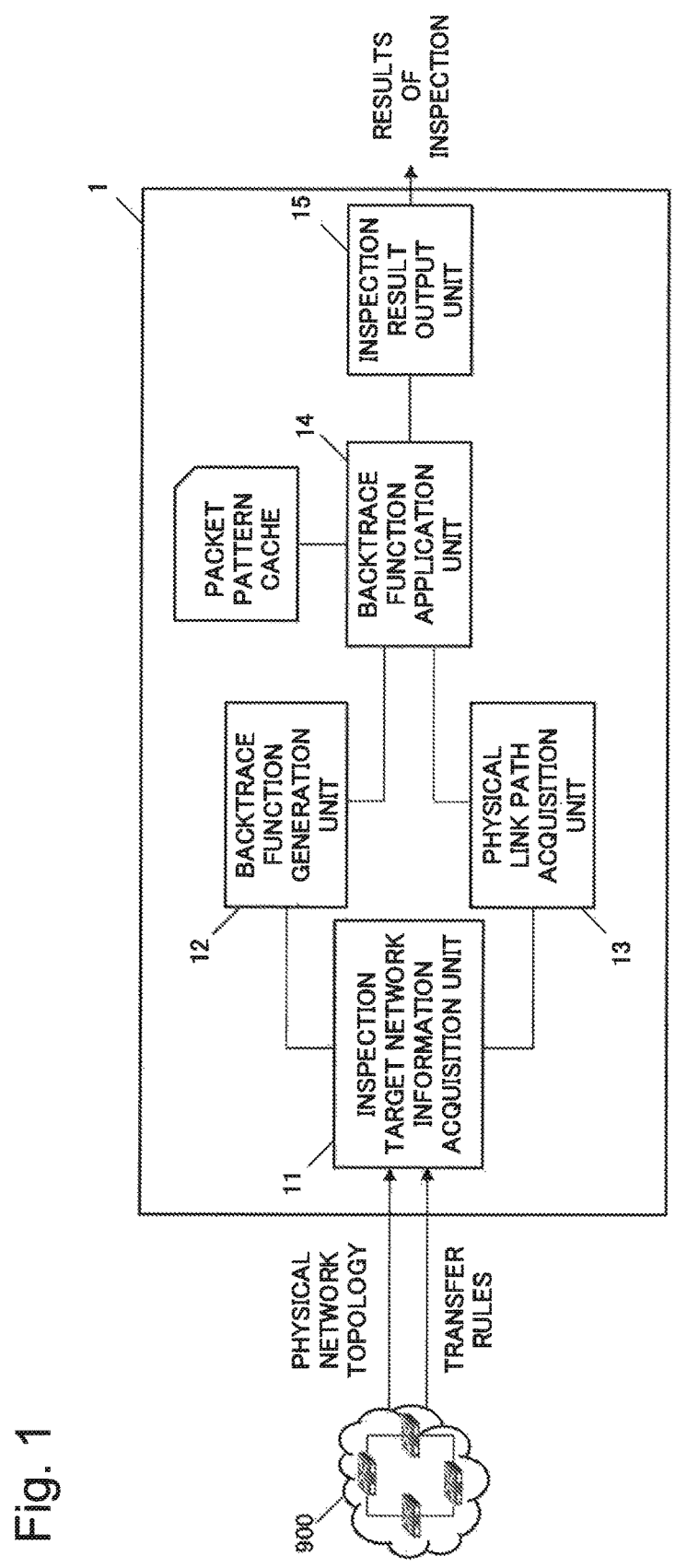
FIG. 1 is a functional block diagram of a network inspection apparatus as a first example embodiment of the present invention.

A functional block configuration of a network inspection apparatus 1 as a first example embodiment of the present invention is shown in FIG. 1. In FIG. 1, the network inspection apparatus 1 includes an inspection target network information acquisition unit 11, a backtrace function generation unit 12, a physical link path acquisition unit 13, a backtrace function application unit 14, and an inspection result output unit 15.

Furthermore, the network inspection apparatus 1 is communicatively connected to an inspection target network 900. The inspection target network 900 includes one or more switch apparatuses. Hereinafter, the switch apparatus will be also mentioned simply as switch. Each switch includes one or more transfer rules. The transfer rule determines, according to a packet input to an arbitrarily given port of a host apparatus, processing applied for the packet, the output port therefor, and the like. The network inspection apparatus 1 treats the inspection target network 900 described above as target for inspection.

Figure 2:
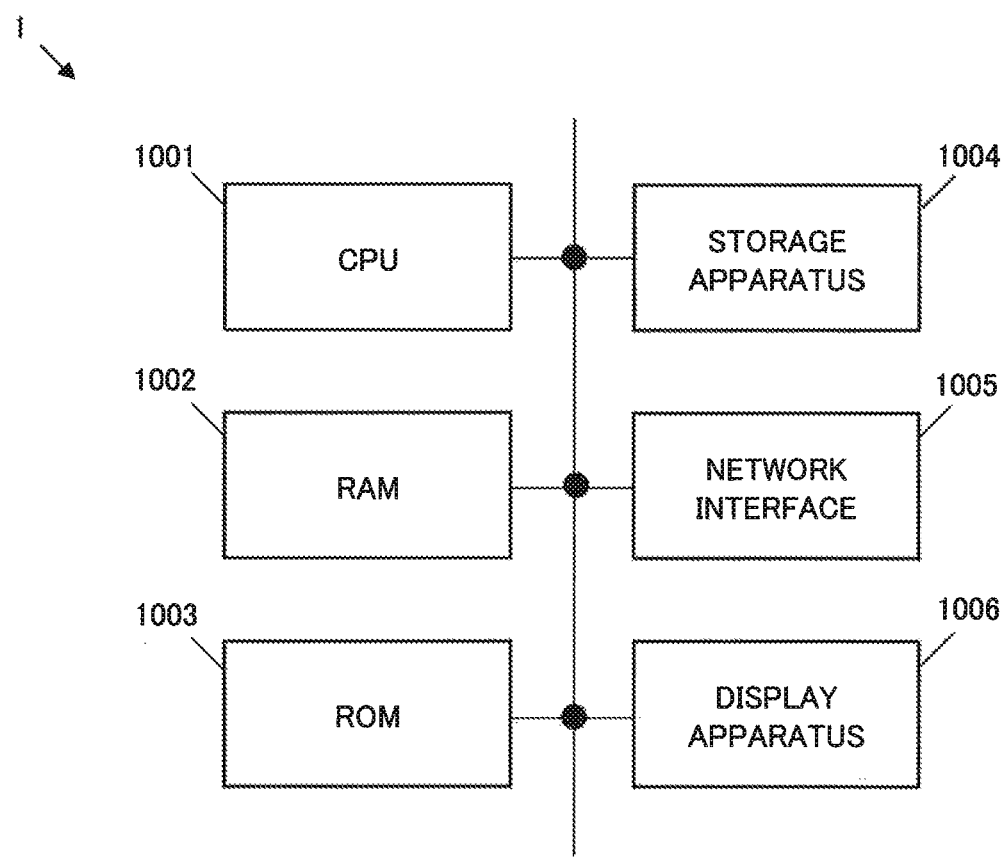
FIG. 2 is a hardware configuration diagram of the network inspection apparatus of the first example embodiment of the present invention.

Here, an example of a hardware configuration of the network inspection apparatus 1 is shown in FIG. 2. In FIG. 2, the network inspection apparatus 1 is constituted of a CPU (Central Processing Unit) 1001, a RAM (Random Access Memory) 1002, a ROM (Read Only Memory) 1003, a storage apparatus 1004 such as a hard disk, a network interface 1005, and a display apparatus 1006. In this case, the inspection target network information acquisition unit 11 is constituted as follows. That is, this functional block is constituted of the network interface 1005 and the CPU 1001 that reads computer programs and various data which are stored in the ROM 1003 and the storage apparatus 1004 into the RAM 1002 and executes the program. The backtrace function generation unit 12, the physical link path acquisition unit 13, and the backtrace function application unit 14 are constituted as follows. That is, these functional blocks are constituted by the CPU 1001 that reads the computer programs and various data which are stored in the ROM 1003 and the storage apparatus 1004 into the RAM 1002, and executes the program. The inspection result output unit 15 is constituted by the display apparatus 1006 and the CPU 1001 that reads the computer programs and various data which are stored in the ROM 1003 and the storage apparatus 1004 into the RAM 1002, and executes the program. The hardware constructions of the network inspection apparatus 1 and the various functional blocks are not limited to the aforementioned configuration.

The inspection target network information acquisition unit 11 acquires transfer rules about packets in switches in the inspection target network 900 and physical network topology information about the inspection target network 900. For example, the inspection target network information acquisition unit 11 is able to acquire the physical network topology information thereabout, by accessing the inspection target network 900 via the network interface 1005. The inspection target network information acquisition unit 11 is able to acquire the transfer rules in the switches in the inspection target network 900 by accessing the switches via the network interface 1005.

The backtrace function generation unit 12 generates backtrace functions on the basis of the transfer rules of the switches. A backtrace function is a function that, on the basis of the packet pattern that is output from a certain port of a switch, calculates backward the packet pattern that is input to a port corresponding to the certain port of that switch. Here, the packet pattern refers to the pattern of a header that the packet includes. A port from which a packet is output will be hereinafter described also as an output port. The packet pattern of a packet output from an output port will be also described simply as the packet pattern at the output port. A port to which a packet is input will be hereinafter described also as an input port. The packet pattern of a packet input to an input port will be also described simply as the packet pattern at the input port.

The physical link path acquisition unit 13, on the basis of the physical network topology information and the transfer rules, acquires a physical link path that represents a series of ports extending from an incoming port to an outgoing port in the inspection target network 900. The incoming port is a port of a switch through which a packet from an external flows into the inspection target network 900. The outgoing port is a port of a switch from which a packet from the inspection target network 900 to an external flows out. The physical link path acquisition unit 13 may store a list of acquired physical link paths into the RAM 1002 or the storage apparatus 1004.

The backtrace function application unit 14 calculates the packet pattern at the incoming port of a packet that reaches the outgoing port, by sequentially applies backtrace functions from the outgoing port toward the incoming port of a physical link path to while using a packet pattern cache. Here, the packet pattern cache is a storage that stores the packet pattern at an intermediate port on a physical link path of a packet that reaches the outgoing port from that intermediate port. For example, the packet pattern cache can be constituted by the storage apparatus 1004 or the RAM 1002.

At this time, the backtrace function application unit 14 may set a predetermined value as a packet pattern that flows out from an outgoing port of a physical link path. The predetermined value may be a value that represents all the packet patterns that are assumed. For example, the backtrace function application unit 14 applies, to a packet pattern for which a predetermined value has been set, a backtrace function that is based on a transfer rule which enables the outgoing port of a switch to output the packet having the packet pattern from that outgoing port. Due to this, the backtrace function application unit 14 can calculate backward the packet pattern at the input port of the switch that includes the outgoing port. The calculated packet pattern is also the packet pattern of a packet that is output from the output port of a preceding switch connected to the input port that is included in the physical link path. Therefore, the backtrace function application unit 14 may store the calculated packet pattern into the packet pattern cache as the packet pattern at the output port of the preceding switch of the packet that reaches the outgoing port of the switch from that output port of the preceding switch. At the preceding switch, the backtrace function application unit 14 apples, to the packet pattern at the output port of that preceding switch, the backtrace function that is based on the transfer rule that enables that output port to output a packet having the packet pattern from that output port. Further, the backtrace function application unit 14 repeatedly stores the packet pattern calculated through applying the backtrace function, into the packet pattern cache at every switch from the outgoing port to the incoming port. Due to this, the backtrace function application unit 14 is able to calculate the packet pattern at the incoming port of the physical link path.

In that calculation, in the case where an already calculated packet pattern, with regard to an intermediate port on the physical link path, that reaches the outgoing port has been stored in the packet pattern cache, the backtrace function application unit 14 operates as follows. That is, the backtrace function application unit 14 reuses the already calculated packet pattern when finding the incoming packet pattern of the physical link path. In this case, the backtrace function application unit 14 is able to omit the backward calculation from the outgoing port and, is able to use the packet pattern already calculated with regard to the intermediate port to apply sequentially backtrace functions from the intermediate port toward the incoming port. Furthermore, in this case, when the backtrace function application unit 14 calculates a packet pattern cache at an intermediate port which has not been stored in the packet pattern cache during the process of sequentially applying backtrace functions, backtrace function application unit 14 is able to store it into the packet pattern cache.

The inspection result output unit 15 outputs results of the process performed by the backtrace function application unit 14. For example, the inspection result output unit 15 may output information that represents combinations of the packet pattern at an incoming port and an outgoing port. The backtrace function application unit 14 may output a result of the process to an output apparatus such as the display apparatus 1006. Furthermore, the inspection result output unit 15 may output a result of the process to the storage apparatus 1004 as a file or the like. Furthermore, the inspection result output unit 15 may output a result of the process to other apparatuses (not graphically shown) connected via the network interface 1005.

Operations of the network inspection apparatus 1 configured as in the above will be described with reference to FIG. 3.

Figure 3:
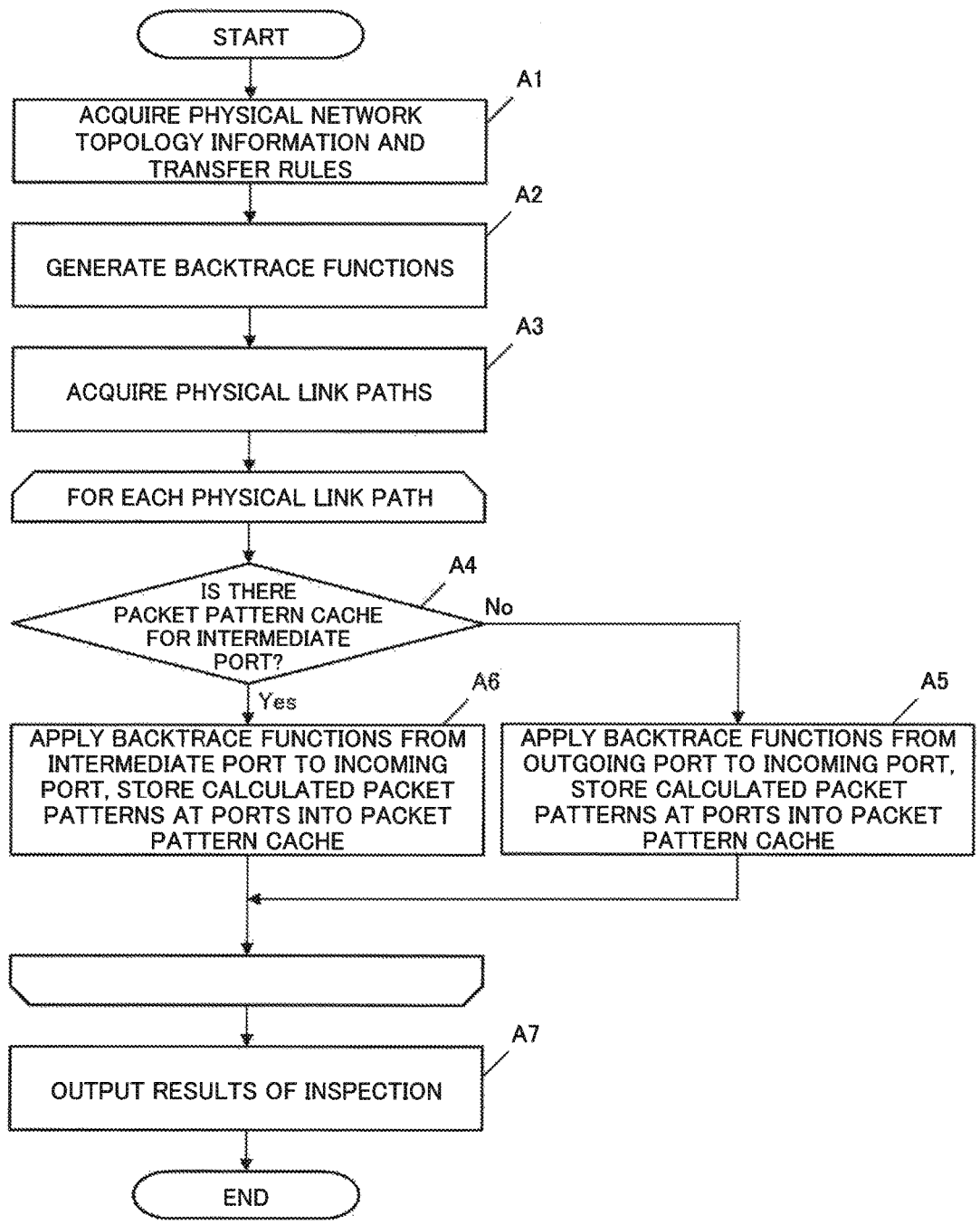
FIG. 3 is a flowchart illustrating an operation of the network inspection apparatus as the first example embodiment of the present invention.

In FIG. 3, the inspection target network information acquisition unit 11 acquires the physical network topology information about the inspection target network 900 and transfer rules of the switches (step A1).

Next, the backtrace function generation unit 12 generates backtrace functions on the basis of the transfer rules of the switches acquired in step A1 (step A2). As described above, the backtrace function is a function that, from the packet pattern output from a port of a switch, calculates backward the packet pattern input to a corresponding port of that switch.

Next, the physical link path acquisition unit 13, on the basis of the physical network topology information and the transfer rules acquired in step A1, acquires physical link paths that represent a series of ports that extends from an incoming port to an outgoing port of the inspection target network 900 (step A3).

Next, with respect to each physical link path, the backtrace function application unit 14 sequentially applies backtrace functions from the outgoing port toward the incoming port while using the packet pattern cache. Due to this, the backtrace function application unit 14 calculates the packet pattern at the incoming port of the packet that reaches the outgoing port.

Specifically, in the case where the packet pattern from an intermediate port on a physical link path has not been stored in the packet pattern cache (No in step A4), the backtrace function application unit 14 operates as follows. In this case, the backtrace function application unit 14 repeatedly performs the process of applying a backtrace function based on a corresponding transfer rule, to a packet pattern from the output port of the switch, from the outgoing port toward the incoming port. That is, the backtrace function application unit 14 repeatedly performs the process of calculating backward the packet pattern at the input port of the switch, toward the incoming port. At this time, the backtrace function application unit 14 may apply a predetermined value as the packet pattern at the outgoing port, as described above. At this time, the backtrace function application unit 14 stores into the packet pattern cache the packet patterns calculated in the process of sequentially applying the backtrace functions (step A5). In detail, each packet pattern calculated during the process of applying the backtrace functions is stored into the packet pattern cache as a packet pattern that reaches the outgoing port, with regard to the port from which the packet pattern is output.

In the case where the packet pattern from an intermediate port on the physical link path has been stored in the packet pattern cache (Yes in step A4), the backtrace function application unit 14 operates as follows. In this case, the backtrace function application unit 14 repeatedly performs the process of applying a backtrace function based on a corresponding transfer rule to a packet pattern from the output port of the switch, from the intermediate port toward the incoming port. That is, the backtrace function application unit 14 repeatedly performs the process of calculating backward the packet pattern at the input port of that switch, toward the incoming port. At this time, the backtrace function application unit 14 also stores into the packet pattern cache the packet patterns calculated during the process of sequentially applying backtrace functions (step A6). In this case, each packet pattern calculated during the process of applying the backtrace functions is stored into the packet pattern cache as a packet pattern that reaches the outgoing port, with regard to the port from which the packet pattern is output.

When the process in step A5 or A6 is completed with regard to each physical link path, the inspection result output unit 15 outputs results of the process by the backtrace function application unit 14 (step A7). In particular, as described above, the inspection result output unit 15 may output information that represents combinations of a packet pattern at an incoming port and an outgoing port.

The network inspection apparatus 1 ends the operation by the above processing.

In the following, advantageous effects of the first example embodiment of the present invention will be described.

The network inspection apparatus as the first example embodiment of the present invention can reduce the processing time for calculating incoming packet patterns for a network.

In the following, reasons for that will be described. In the present example embodiment, the inspection target network information acquisition unit acquires the physical network topology information about an inspection target network and the transfer rules of the switches. And the backtrace function generation unit, on the basis of the transfer rules, generates a backtrace function which calculates backward, based on the packet pattern output from a port of a switch, the packet pattern input to a corresponding port of that switch. The physical link path acquisition unit, on the basis of the physical network topology information and the transfer rules, acquires physical link paths from incoming ports to outgoing ports in the inspection target network. And, the backtrace function application unit sequentially applies the backtrace functions from the outgoing ports toward the incoming ports, while using the packet pattern cache. In this case, the backtrace function application unit stores into the packet pattern cache each packet pattern calculated during the process of applying the backtrace functions, as a packet pattern that reaches the outgoing port from an intermediate port from which the packet pattern is output. Due to this, the backtrace function application unit calculates the packet patterns at the incoming ports of the packets that reach the outgoing ports.

Thus, in the present example embodiment, when calculating an incoming packet pattern of a physical link path, if the packet pattern from an intermediate port on that physical link path has been stored in the packet pattern cache, the already calculated packet pattern is used. That is, the present example embodiment can omit the process of applying the backtrace functions from the outgoing port to that intermediate port. Consequently, the present example embodiment can reduce the workload in calculating backtrace functions within a network by reusing the calculation results of backtrace functions that have been calculated once.

Second Example Embodiment

In the following, a second example embodiment of the present invention will be described in detail with reference to the drawings. In the drawings referred to in the description of the present example embodiment, the same configuration and the steps that operate in substantially the same manners as in the first example embodiment are given the same signs as the first example embodiment, and detailed descriptions thereof in the present example embodiment will be omitted.

Figure 4:
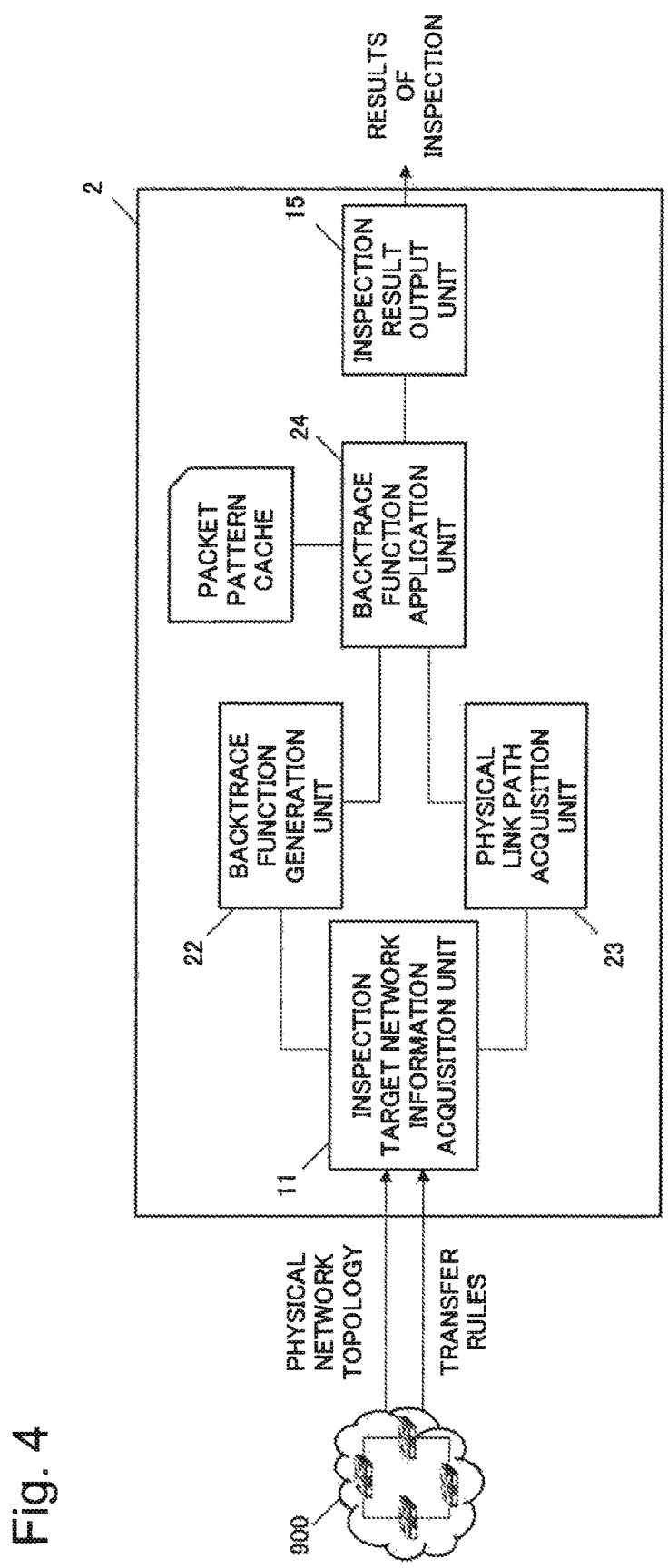
FIG. 4 is a functional block diagram of a network inspection apparatus as a second example embodiment of the present invention.

The construction of the network inspection apparatus 2 as the second example embodiment of the present invention is shown in FIG. 4. In FIG. 4, the network inspection apparatus 2 is different from the network inspection apparatus 1 as the first example embodiment of the present invention in including a backtrace function generation unit 22 instead of the backtrace function generation unit 12. The network inspection apparatus 2 is also different from the network inspection apparatus 1 as the first example embodiment of the present invention in including a physical link path acquisition unit 23 instead of the physical link path acquisition unit 13. The network inspection apparatus 2 is also different from the network inspection apparatus 1 as the first example embodiment of the present invention in including a backtrace function application unit 24 instead of the backtrace function application unit 14. Here, the network inspection apparatus 2 and its various functional blocks can be constituted by the same hardware elements as in the first example embodiment of the present invention described with reference to FIG. 2. However, the hardware configurations of the network inspection apparatus 2 and its various functional blocks are not limited to the above described constructions.

Furthermore, in the present example embodiment, it is assumed that the inspection target network information acquisition unit 11 acquires from each switch a flow table that contains sets of information that respectively represents an input port, a matching pattern, an action, and an output port as a transfer rule. Here, the matching pattern represents a condition to which a packet pattern input to the input port conforms. The action represents a process content for a packet pattern in the case where the packet pattern conforms to the matching pattern. The output port represents a port to which the packet, to which a processing content according to the action is applied, is output.

The backtrace function generation unit 22 generates backtrace functions. Herein, a backtrace function is a function that accepts the packet pattern at the output port of a switch as an input, and outputs the packet pattern at the input port on the basis of the action and the matching pattern of a corresponding flow entry. The backtrace function generation unit 22 is configured so as to operate in a process performed by a backtrace function application unit 24 described later.

The physical link path acquisition unit 23 acquires physical link paths on the basis of the physical network topology information and the transfer rules, similarly to the physical link path acquisition unit 13 in the first example embodiment of the present invention. However, the physical link path acquisition unit 23 is configured so that at least a part of the functions thereof operate during the process performed by the backtrace function application unit 24 described later.

The backtrace function application unit 24 recursively executes a packet pattern calculation process. In particular, in the packet pattern calculation process, the backtrace function application unit 24 uses, as an input, information that represents an input port in a switch. With regard to a packet that reaches an outgoing port from an output port that corresponds to that input port in the switch, the backtrace function application unit 24 applies a backtrace function to the packet pattern of the packet at that output port. Due to this, the backtrace function application unit 24 calculates and outputs information that represents the packet pattern at the input port.

When the backtrace function application unit 24 executes the packet pattern calculation process, if a packet pattern at the output port that corresponds to the input port is stored in the packet pattern cache, the backtrace function application unit 24 reuses the packet pattern. That is, in this case, the backtrace function application unit 24 applies the backtrace function to the packet pattern stored in the packet pattern cache, to produce an output. The backtrace function application unit 24 is configured to perform the following process, if a packet pattern at the output port that corresponds to the input port is not stored in the packet pattern cache. That is, in this case, the backtrace function application unit 24 recursively executes the packet pattern calculation process by using information that represents an input port of the next switch which faces that output port as an input. Then the backtrace function application unit 24 stores into the packet pattern cache the packet pattern obtained from the recursively executed packet pattern calculation process as the packet pattern at the output port. The backtrace function application unit 24 also applies the backtrace function to the packet pattern obtained from the recursively executed packet pattern calculation process to produce an output.

The backtrace function application unit 24 sets a predetermined value as the packet pattern that is output from the outgoing port. The predetermined value may be, for example, a packet pattern that represents that the value of each attribute that constitutes a packet header can be throughout its value range.

In the packet pattern calculation process, the backtrace function application unit 24 may generate backtrace functions by using the backtrace function generation unit 22.

Furthermore, in the packet pattern calculation process, the backtrace function application unit 24 may recursively execute the packet pattern calculation process while searching a physical link path by using the physical link path acquisition unit 23.

The backtrace function application unit 24 may output a set of pairs of the packet pattern at the input port and the outgoing port of the searched physical link path as the output of the packet pattern calculation process. Furthermore, in this case, the backtrace function application unit 24 is able to store into the packet pattern cache a pair of the packet pattern at the input port and the outgoing port in association with the output port of a switch that precedes the input port.

Operations of the network inspection apparatus 2 configured as in the above will be described in detail with reference to FIGS. 5 to 6.

Figure 5:
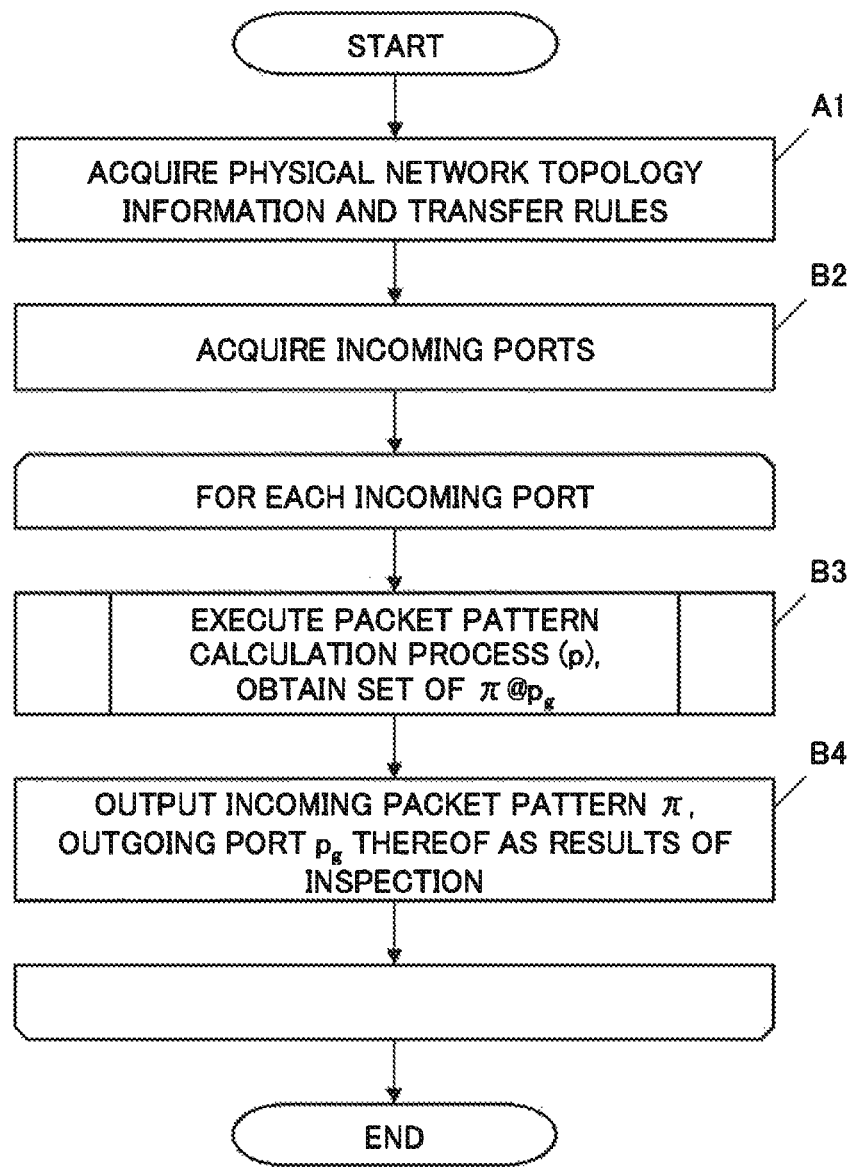
FIG. 5 is a flowchart illustrating an outline of operation of the network inspection apparatus as the second example embodiment of the present invention.

In the following, an overall operation of the network inspection apparatus 2 is shown in FIG. 5.

In FIG. 5, first, the inspection target network information acquisition unit 11 executes step A1 as in the first example embodiment of the present invention to obtain the physical network topology information and the transfer rules from the inspection target network 900. Here, the flow table is acquired as the transfer rules.

Next, the physical link path acquisition unit 23, on the basis of the physical network topology information, acquires a set of ports "p" that can be the initial ports (incoming ports) of physical link paths in the inspection target network 900 (step B2).

Next, the backtrace function application unit 24 repeats the process of steps B3 to B4 for each incoming port "p".

Here, first, the backtrace function application unit 24, by calling the packet pattern calculation process with using the incoming ports "p" as inputs, obtains a set of pairs of the packet pattern "$\pi$" at an incoming port "p" and the outgoing port "$p_g$" in that case (step B3). Hereinafter, the pair of a packet pattern "$\pi$" at an incoming port "p" and the outgoing port "$p_g$" in that case will be described as "$\pi@p_g$" or "($\pi$, $p_g$)" as well.

Next, the inspection result output unit 15 outputs, as a result of inspection, information that represents the set of pairs of a packet pattern "$\pi$" at an incoming port "p" and the outgoing port "$p_g$" (step B4).

When the process of steps B3 to B4 is completed for each incoming port, the network inspection apparatus 2 ends the operation.

Figure 6:
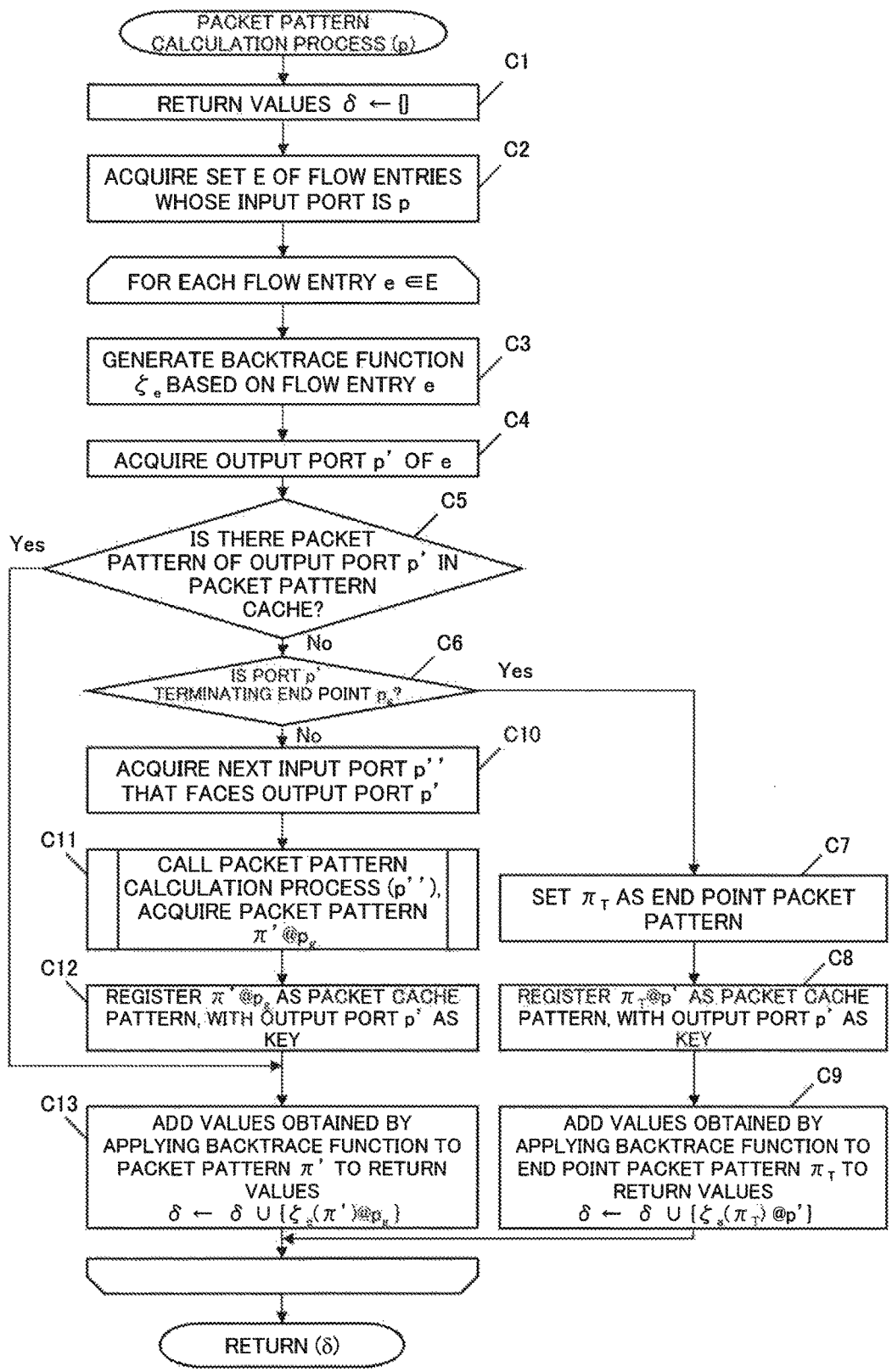
FIG. 6 is a flowchart illustrating details of a packet pattern calculation process that is recursively executed by the network inspection apparatus as the second example embodiment of the present invention.

Next, details of the packet pattern calculation process in step B3 are shown in FIG. 6. Here, the input in the packet pattern calculation process is an input port "p" as described above. The outputs are a set "$\delta$" of pairs "($\pi$, $p_g$)" of an outgoing port "$p_g$" and a packet pattern "$\pi$" at a port "p" of a packet, which reaches the outgoing port "$p_g$" from the port "p".

Here, first, the backtrace function application unit 24 substitutes an empty set for the operation variable $\delta$ provided for a return value (step C0).

Next, the backtrace function application unit 24, using the physical link path acquisition unit 23, obtains a set "E" of flow entries in which a port "p" is the input port (step C2).

Next, the backtrace function application unit 24 repeatedly executes the process of steps C3 to C13 as follows, separately for each flow entry "e∈E" that is an element of E.

Firstly, the backtrace function application unit 24, by using the backtrace function generation unit 22, generates a backtrace function "$\zeta_e$", based on a flow entry "e" (step C3). Details of the backtrace function "$\zeta_e$" will be described later.

Next, the backtrace function application unit 24, by using the physical link path acquisition unit 23, obtains the output port "p'" of the flow entry "e" (step C4).

Next, with regard to the output port "p'", the backtrace function application unit 24 checks whether or not a pair "($\pi$', $p_g$)" of a packet pattern and an outgoing port that correspond to that output port "p'" is stored in the packet pattern cache and, if that pair is present, acquires the pair (step C5).

In the case where corresponding data are not stored in the packet pattern cache, the backtrace function application unit 24 examines whether or not the aforementioned output port "p'" is a terminating end switch port (outgoing port) (step C6).

In the case where the output port "p'" is a terminating end switch port, the backtrace function application unit 24 sets a packet pattern "$\pi_T$" of which all of the attributes have a value of "T", as a packet pattern from the output port "p'" (step C7).

Next, the backtrace function application unit 24 stores the pair of the packet pattern "$\pi_T$" and the outgoing port "p'" in association with the output port "p'" into the packet pattern cache (step C8).

Next, the backtrace function application unit 24 obtains the packet pattern "$\zeta_e(\pi_T)$" at the input port "p" by applying the backtrace function "$\zeta_e$" to the packet pattern "$\pi_T$" output from the output port "p'". Then the backtrace function application unit 24 adds the pair of the "$\zeta_e(\pi_T)$" and the outgoing port "p'" to the return values "$\delta$" (step C9).

The backtrace function application unit 24 repeats the process from step C3 with respect to the next flow entry "e".

On the other hand, in step C6, when the output port "p'" is not a terminating end switch port (outgoing port), the backtrace function application unit 24, by using the physical link path acquisition unit 23, finds a port "p''" that faces the output port "p'" in the physical link (step C10).

Next, the backtrace function application unit 24 calls a packet pattern calculation process, with the port "p''" as an input. Due to this, the backtrace function application unit 24 obtains a set of pairs"($\pi$', $p_g$)" of an outgoing port "$p_g$" and the packet pattern "$\pi$'" that flows into the port "p''", where the port "p''" is the input port (step C11).

Next, the backtrace function application unit 24 stores the set of "($\pi$', $p_g$)" obtained in step C11 into the packet pattern cache, with the output port "p'" as a key (step C12).

Next, the backtrace function application unit 24 obtains the packet pattern "$\zeta_e(\pi')$" at the input port "p" by applying the backtrace function "$\zeta_e$" to the packet pattern "$\pi$'" output from the output port "p'". The backtrace function application unit 24 adds the pair of "$\zeta_e(\pi')$" and the outgoing port "$p_g$" to the return values "$\delta$" (step C13).

Then the backtrace function application unit 24 repeats the process from step C3 with respect to the next flow entry "e".

In step C5, when corresponding data are stored in the packet pattern cache, the backtrace function application unit 24 executes the process of step C13 by using the corresponding data "($\pi$', $p_g$)" in the packet pattern cache.

Then the backtrace function application unit 24 repeats the process from step C3 with respect to the next flow entry "e".

When the process of steps C3 to C13 is completed with regard to each flow entry "e" that belongs to the set "E" of flow entries obtained in step C2, the backtrace function application unit 24 returns the values "$\delta$" and goes back to the process that called this packet pattern calculation process.

Detail of the packet pattern calculation process has been explained as above.

In the following, the backtrace function "$\zeta_e$" that is generated in step C3 will be described. The backtrace function application unit 24, on the basis of a flow entry "e", may generate, for example, a backtrace function "$\zeta_e$" that is defined as follows.

As stated above, a flow entry "e" is constituted to include four pieces of information that respectively represent an input port, a matching pattern, an action, and an output port.

Here, it is assumed that the matching pattern is constituted by attribute values "$A_{m\_1}$", ..., "$A_{m\_n}$". Furthermore, it is assumed that the action is constituted by attribute values "$A_{a\_1}$", ..., "$A_{a\_n}$". Incidentally, the attribute value "$A_{m\_i}$" of the matching pattern can take a value representing a point set "$\{v\}$", an entire set "T" of the range of the value, a subset "r" of the range such as an IP subnetwork or the like, an empty set "⊥", or a difference set "$(A'_{m\_i} - A''_{m\_i})$" obtained by subtracting an attribute value "$A''_{m\_i}$" from an attribute value "$A'_{m\_i}$". The attribute value "$A_{a\_1}$" of the action can take a value "v" or an entire set "T" of the range of the value "v".

It is also assumed that the packet pattern "π" is constituted by attribute values "$A_{\pi\_1}$", ..., "$A_{\pi\_n}$". The attribute value "$A_{\pi\_i}$" of the packet pattern can take a value "v", the entire set "T" of range the value, a subset "r" of the range, such as IP subnetworks and the like, an empty set "⊥", a difference set "$(A'_{m\_i} - A''_{m\_i})$" obtained by subtracting an attribute value "$A''_{m\_i}$" from an attribute value "$A'_{m\_i}$", or a sum set "$(A'_{m\_i} \cup A''_{m\_i})$" of an attribute value "$A'_{m\_i}$" and an attribute value "$A''_{m\_i}$".

In this case, a backtrace function "$\zeta_e$" based on a flow entry "e" is defined as in the following equation (1).

$$e((A_{\pi\_1}, \ldots, A_{\pi\_n})) := (\mu(A_{m\_1}, \alpha(A_{a\_1}, A_{\pi\_1})), \ldots, \mu(A_{m\_n}, \alpha(A_{a\_n}, A_{\pi\_n}))) \quad (1)$$

Here, the function "α: (the attribute value of an action)×(the pattern of the attribute value of a packet header)→(the packet pattern)" in the equation (1) is defined as in Table 1 below.

Furthermore, the function "μ: (the attribute value of matching rule)×(the pattern of the attribute value of a packet header)→(the packet pattern)" in the equation (1) is defined as in Table 2.

Due to the definitions of the backtrace functions as above, the packet pattern at each output port is determined, independently of the forward trace path from the incoming port to the outgoing port, but depending only on the backtrace path from the outgoing port. In consequence, cache data about the packet pattern can be reused.

An example of the definition of the backtrace function generated in step C3 has been explained as above.

In the following, by referring to specific examples, operations of the second example embodiment of the present invention will be described.

Figure 7:
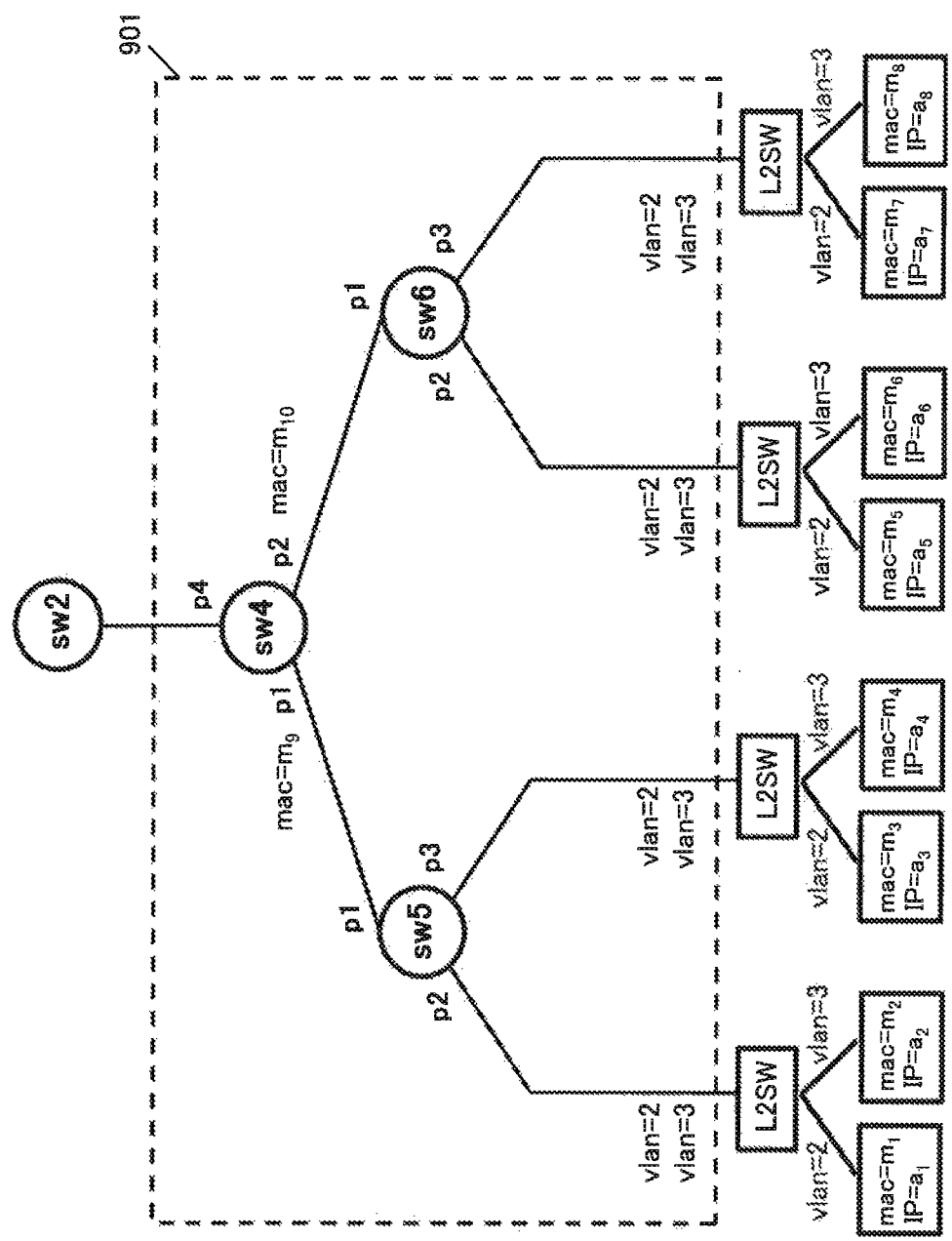
FIG. 7 is a diagram showing an example of an inspection target network in the second example embodiment of the present invention.

FIG. 7 shows an inspection target network 901 used as a specific example. The inspection target network 901 is constituted by three switches sw4, sw5, and sw6. The switch sw4 includes ports p1, p2, and p4, sw5 includes ports p1, p2, and p3, and sw6 includes ports p1, p2, and p3. Hereinafter, a port pi of a switch swi is described also as swi_pi. In the inspection target network 901, the ports sw5_p2, sw5_p3, sw6_p2, sw6_p3, and sw4_p4 are endpoints. The port sw4_p4 is connected to a switch sw2 that is outside the inspection target network 901. The ports sw5_p2, sw5_p3, sw6_p2, and sw6_p3 are individually connected to Layer 2 switches (L2SW) that are outside the inspection target network 901. As for each Layer 2 switch, a VLAN ID (virtual local area network ID) as illustrated is set for each port. The Layer 2 switches are connected to apparatuses that have a MAC address (media access control address) and an IP address (Internet Protocol address) as illustrated. In FIG. 7, "mac=$m_i$" represents that the MAC address of that apparatus is "$m_i$" and "IP=$a_i$" represents that the IP address set for that apparatus is "$a_i$". The MAC address of the port p1 of the switch sw4 is "$m_9$" and the MAC address of the port p2 of the switch sw4 is "$m_{10}$".

It is also assumed that some of the flow entries in this inspection target network 901 have been defined as in FIG. 8. In FIG. 8, each line represents a flow entry that a switch

TABLE 1

DEFINITION OF ACTION FUNCTION α

| α | | {v'} | r' | T | ⊥ | $A'_{m\_i} - A''_{m\_i}$ | $A'_{m\_i} \cup A''_{m\_i}$ |
|---|---|---|---|---|---|---|---|
| ACTION | {v} | T if v == v'<br>⊥ otherwise | T if v∈r'<br>⊥ otherwise | T | ⊥ | $\alpha(\{v\}, A'_{m\_i}) - A''_{m\_i}$ | $\alpha(\{v\}, A'_{m\_i}) \cup \alpha(\{v\}, A''_{m\_i})$ |
| | T | {v'} | r' | T | ⊥ | $A'_{m\_i} - A''_{m\_i}$ | $A'_{m\_i} \cup A''_{m\_i}$ |

TABLE 2

DEFINITION OF MATCHING RULE FUNCTION μ

| μ | | {v'} | r' | T | ⊥ | $A'_{m\_i} - A''_{m\_i}$ | $A'_{m\_i} \cup A''_{m\_i}$ |
|---|---|---|---|---|---|---|---|
| MATCHING RULE | {v} | {v} if v == v'<br>⊥ otherwise | {v} if v∈r'<br>⊥ otherwise | {v} | ⊥ | $\mu(\{v\}, A'_{m\_i}) - A''_{m\_i}$ | $\mu(\{v\}, A'_{m\_i}) \cup \mu(\{v\}, A''_{m\_i})$ |
| | p | {v'} if v'∈r<br>⊥ otherwise | p' if p'⊂p<br>p if p'⊃p<br>⊥ otherwise | P | ⊥ | $\mu(r, A'_{m\_i}) - A''_{m\_i}$ | $\mu(r, A'_{m\_i}) \cup \mu(r, A''_{m\_i})$ |
| | T | {v'} | r' | T | ⊥ | $A'_{m\_i} - A''_{m\_i}$ | $A'_{m\_i} \cup A''_{m\_i}$ |
| | ⊥ | ⊥ | ⊥ | ⊥ | ⊥ | ⊥ | ⊥ |
| | $A'_{m\_i} - A''_{mm\_i}$ | $\mu(A'_{m\_i}, \{v'\}) - A''_{mm\_i}$ | $\mu(A'_{m\_i}, r') - A''_{mm\_i}$ | $A'_{m\_i} - A''_{mm\_i}$ | ⊥ | $\mu(A'_{m\_i} - A''_{mm\_i}, A'_{m\_i}) - A''_{m\_i}$ | $\mu(A'_{m\_i} - A''_{mm\_i}, A'_{m\_i}) \cup \mu(A'_{m\_i} - A''_{mm\_i}, A''_{m\_i})$ | sw4 to sw6 includes. The left side of "→" represents an input port and a matching pattern, and the right side represents an action and an output port. For example, the flow entry on the first line regarding the switch sw6 indicates that if the destination MAC address (mac_da) of a packet input through the port p1 of the sw6 is "$m_8$" and the vlan attribute representing the VLAN ID is 3, the packet is transferred to the port p3 of the sw6. The flow entry on the first line regarding the switch sw4 indicates that if the destination IP address (ip_da) of a packet input through the port p1 of the sw4 is "$a_8$", the destination MAC address is rewritten into "$m_8$" and then the packet is transferred to the port p2 of the sw4.

In the inspection target network 901 as above, it is assumed that the backtrace function application unit 24 performs inspection first, about a case that the sw5_p2 is the incoming port. Then, the backtrace function application unit 24 executes a packet pattern calculation process, with the sw5_p2 as an input (step B3). Hereinafter, the packet pattern calculation process using the swi_pi as an input will be described also as packet pattern calculation process (swi_pi).

It is assumed that, in this case, the packet pattern cache does not store a packet pattern with regard to the output port sw5_p1 of the flow entry whose input port is the sw5_p2 (No in step C5). Furthermore, the output port sw5_p1 is not a terminating endpoint port (No in step C6). Then, in the packet pattern calculation process (sw5_p2), the backtrace function application unit 24 recursively calls a packet pattern calculation process (sw4_p1), with the sw4_p1, as input, that faces the output port sw5_p1 (step C11).

It is assumed that in this case, the packet pattern cache does not store a packet pattern with regard to the output port sw4_p2 for the flow entry whose input port is the sw4_p1 (No in step C5). The output port sw4_p2 is not a terminating endpoint port (No in step C6). Then, in the packet pattern calculation process (sw4_p1), the backtrace function application unit 24 recursively calls a packet pattern calculation process (sw6_p1), with the sw6_p1, as input, that faces the sw4_p2 (step C11).

Here, in the packet pattern calculation process (sw6_p1), the backtrace function application unit 24 obtains, regarding one of the flow entries "e", the sw6_p3 as the output port "p'" for that flow entry "e" (step C4). Although the packet patterns regarding the sw6_p3 are not stored in the packet pattern cache (No in step C5), the sw6_p3 is a terminating endpoint port (outgoing port) (Yes in step C6). Then, the backtrace function application unit 24 associates the pair "$\pi_T$@sw6_p3" of the packet pattern "$\pi_T$" and the outgoing port sw6_p3 with the sw6_p3 and thus stores it in the packet pattern cache (steps C7 to C8).

It is assumed that the packet pattern has three attributes of mac_da, vlan, and ip_da, and which are described as "$\pi_T$=(mac_da=T, vlan=T, ip_da=T)". Although, in some cases, a packet pattern may have many kinds of attributes, it is assumed here that the packet pattern has these three attributes for simplicity for explanation. As described above, "T" is the entire set of the ranges that the attributes can take. In this case, it means that data "A" indicated in FIG. 9 have been stored in the packet pattern cache.

The backtrace function application unit 24 applies the backtrace function "$\zeta_e$" with regard to the flow entry "e" at this time, to the "$\pi_T$@sw6_p3", and calculates "$\zeta_e(\pi_T)$@sw6_p3". Results of this calculation are as follows.

{(mac_da=$m_8$, vlan=3, ip_da=T)@sw6_p3, (mac_da=$m_7$, vlan=2, ip_da=T)@sw6_p3}.

And the backtrace function application unit 24 adds the results of the above calculation to the return values "δ" of the packet pattern calculation process (sw6_p1) (step C9).

Next, in the packet pattern calculation process (sw6_p1), the backtrace function application unit 24 obtains the sw6_p2 as the output port "p'" with regard to the next flow entry "e" (step C4). Here, although a packet pattern regarding the sw6_p2 is not stored in the packet pattern cache (No in step C5), the sw6_p2 is a terminating endpoint port (outgoing port) (Yes in step C6). Therefore, the backtrace function application unit 24 associates the "$\pi_T$@sw6_p2" with the sw6_p2 and stores it into the packet pattern cache (steps C7 to C8). As a result of this, data "B" indicated in FIG. 9 have been stored in the packet pattern cache.

The backtrace function application unit 24 applies the backtrace function "$\zeta_e$" regarding the then flow entry "e" to the "$\pi_T$@sw6_p2", and calculates the "$\zeta_e(\pi_T)$@sw6_p2". Results of this calculation are as follows.

{(mac_da=$m_6$, vlan=3, ip_da=T)@sw6_p2, (mac_da=$m_5$, vlan=2, ip_da=T)@sw6_p2}.

The backtrace function application unit 24 adds the aforementioned results of the calculation to the return values "δ" of the packet pattern calculation process (sw6_p1) (step C9).

It is assumed that in the packet pattern calculation process (sw6_p1), there is no other flow entry whose input port is the sw6_p1. Therefore, the return values "δ" of the packet pattern calculation process (sw6_p1) are as follows.

{(mac_da=$m_8$, vlan=3, ip_da=T)@sw6_p3, (mac_da=$m_7$, vlan=2, ip_da=T)@sw6_p3, (mac_da=$m_6$, vlan=3, ip_da=T)@sw6_p2, (mac_da=$m_5$, vlan=2, ip_da=T)@sw6_p2}.

Here, the return values of the packet pattern calculation process (sw6_p1) are results of step C11 in the process of the packet pattern calculation process (sw4_p1). Therefore, the backtrace function application unit 24 stores the return values "δ" into the packet cache pattern, with the sw4_p2 as a key (step C12). As a result of this, data "C" indicated in FIG. 9 have been stored in the packet pattern cache.

Next, the backtrace function application unit 24 applies the backtrace function "$\zeta_e$" regarding the then flow entry "e" to the return values of the packet pattern calculation process (sw6_p1). Results of this calculation are as follows.

{(mac_da=T, vlan=3, ip_da=$a_8$)@sw6_p3, (mac_da=T, vlan=2, ip_da=$a_7$)@sw6_p3, (mac_da=T, vlan=3, ip_da=$a_6$)@sw6_p2, (mac_da=T, vlan=2, ip_da=$a_5$)}@sw6_p2}.

The backtrace function application unit 24 adds this value to the return values δ of the packet pattern calculation process (sw4_p1) (step C13).

It is assumed that in the packet pattern calculation process (sw4_p1) there is no other flow entry whose input port is the sw4_p1. Therefore, the values "δ" are the return values of the packet pattern calculation process (sw4_p1).

Here, the return values of the packet pattern calculation process (sw4_p1) are a result of step C11 in the process of the packet pattern calculation process (sw5_p2). Then, the backtrace function application unit 24 stores the aforementioned return values "δ" into the packet cache pattern, with the sw5_p1 as a key (step C12). Here, data "D" indicated in FIG. 9 have been stored in the packet pattern cache.

Next, the backtrace function application unit 24 applies the backtrace function "$\zeta_e$" regarding the then flow entry "e" to the return values of the packet pattern calculation process (sw4_p1). Results of this calculation are as follows.

{[(mac_da=$m_9$, vlan=3, ip_da=$a_8$)@sw6_p3, (mac_da=$m_9$, vlan=2, ip_da=$a_7$)@sw6_p3, (mac_da=$m_9$, vlan=3, ip_da=$a_6$)@sw6_p2, (mac_da=$m_9$, vlan=2, ip_da=$a_5$)@sw6_p2}

The backtrace function application unit 24 adds this value to the return values "δ" of the packet pattern calculation process (sw5_p2) (step C13).

It is assumed that in the packet pattern calculation process (sw5_p2) there is no other flow entry whose input port is the sw5_p2. Therefore, the aforementioned values of "δ" are return values of the packet pattern calculation process (sw5_p2).

In this manner, the backtrace function application unit 24 is able to find pairs of an incoming packet pattern at the incoming port sw5_p2 and an outgoing port.

Next, an inspection result display unit 25 outputs results of inspection (1) to (3) as follows, on the basis of the pairs of an incoming packet pattern at the aforementioned incoming port sw5_p2 and an outgoing port.
Results of Inspection (1)

In the case where a packet that satisfies a condition "A" flows into the incoming port sw5_p2, the packet always flows out from the sw6_p3.

Here, the condition "A" is a condition that
the destination MAC address (mac_da) is "$m_9$" and the VLAN ID (vlan) is 3 and the IP address (ip_da) is "$a_8$" or
the destination MAC address (mac_da) is "$m_9$" and the VLAN ID (vlan) is 2 and the IP address (ip_da) is "$a_7$".
Results of Inspection (2)

In the case where a packet that satisfies a condition "B" flows into the incoming port sw5_p2, the packet always flows out from the sw6_p2.

Here, the condition "B" is a condition that
the destination MAC address (mac_da) is "$m_9$" and the VLAN ID (vlan) is 3 and the IP address (ip_da) is "$a_6$" or
the destination MAC address (mac_da) is "$m_9$" and the VLAN ID (vlan) is 2 and the IP address (ip_da) is "$a_5$".
Results of Inspection (3)

The incoming packet from the sw5_p2 which does not satisfy the condition "A" does not arrive at the sw6_p3. Furthermore, the incoming packet from the sw5_p2 which does not satisfy the condition B does not arrive at the sw6_p2.

Figure 9:
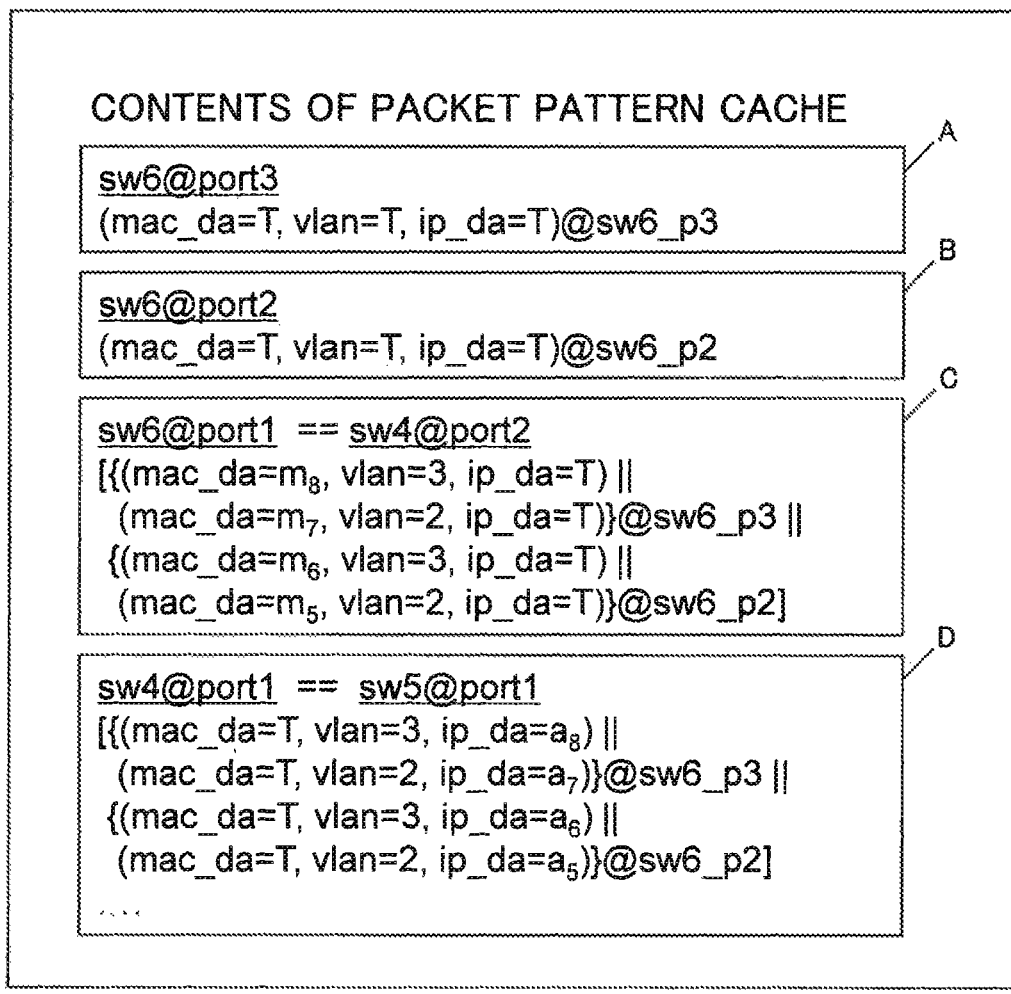
FIG. 9 is a diagram showing an example of information stored in a packet pattern cache in the second example embodiment of the present invention.

Next, likewise, the backtrace function application unit 24 performs inspection with the sw5_p3 as the incoming port. First, the backtrace function application unit 24 executes the packet pattern calculation process (sw5_p3), with the sw5_p3 as an input. In this case, the sw5_p1 is the output port of a flow entry whose input port (step C4). Here, the packet pattern cache stores packet patterns (data "D") with the output port sw5_p1 as a key, as illustrated in FIG. 9 (Yes in step C5).

Therefore, the backtrace function application unit 24 acquires packet patterns of which key is the output port sw5_p1 from the packet pattern cache, and applies the backtrace function "$\zeta_e$" regarding the flow entry "e" to the acquired packet patterns. By this, pairs of an incoming packet pattern at the incoming port sw5_p3 and an outgoing port are calculated.

As described above, the backtrace function application unit 24 is able to find the pairs of an incoming packet pattern at the incoming port sw5_p3 and an outgoing port, by reusing the packet pattern cache having the sw5_p1 as the key. Because of reuse of the packet pattern cache, the backtrace function application unit 24 can find the incoming packet patterns at the sw5_p3 without recursively executing the packet pattern calculation processes with using the sw4_p1 and the sw6_p1 as respective inputs. Because of this, the backtrace function application unit 24 is able to realize high-speed inspection.

Figure 10:
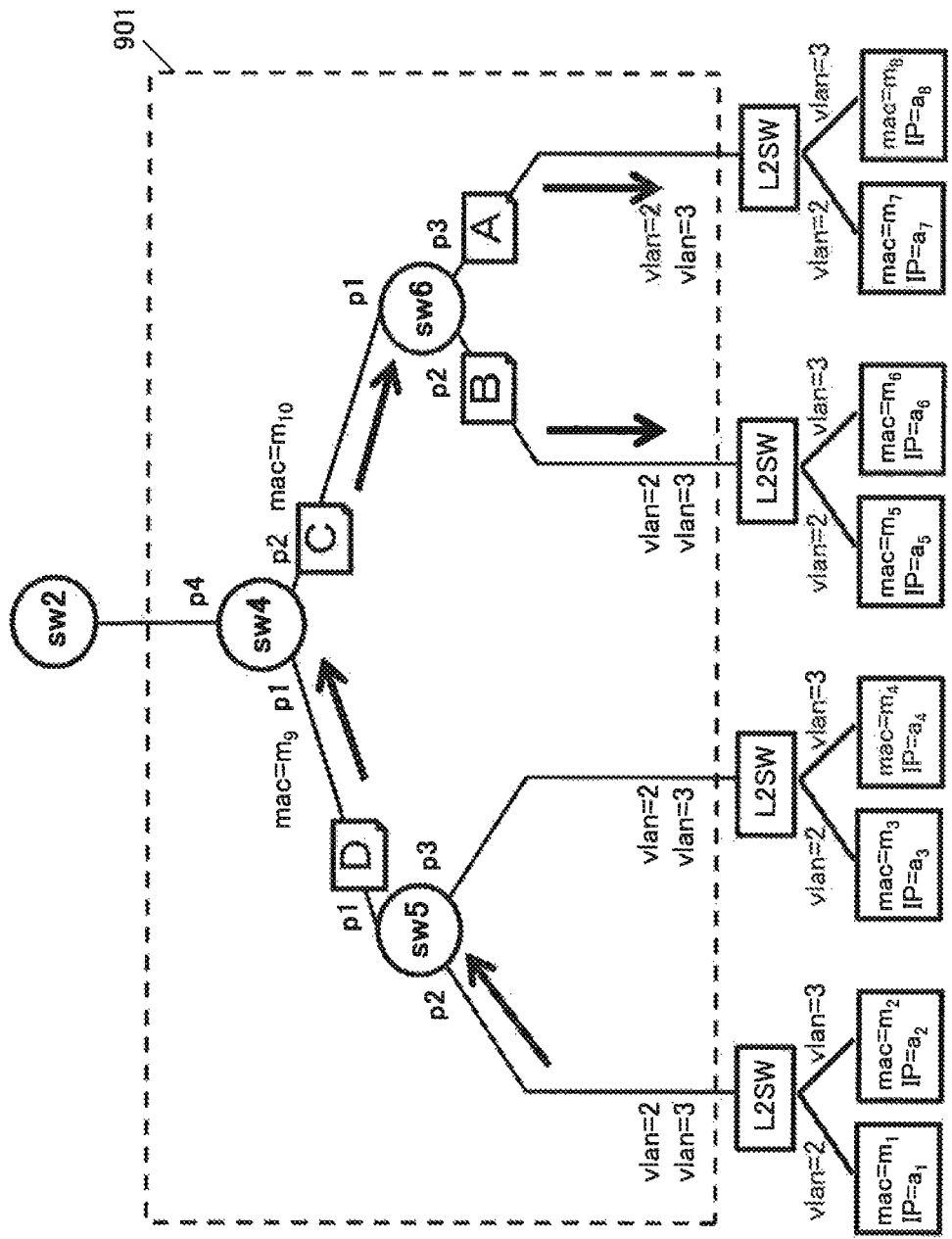
FIG. 10 is a schematic diagram illustrating a process to find an incoming packet pattern of a physical link path in the second example embodiment of the present invention.
Figure 11:
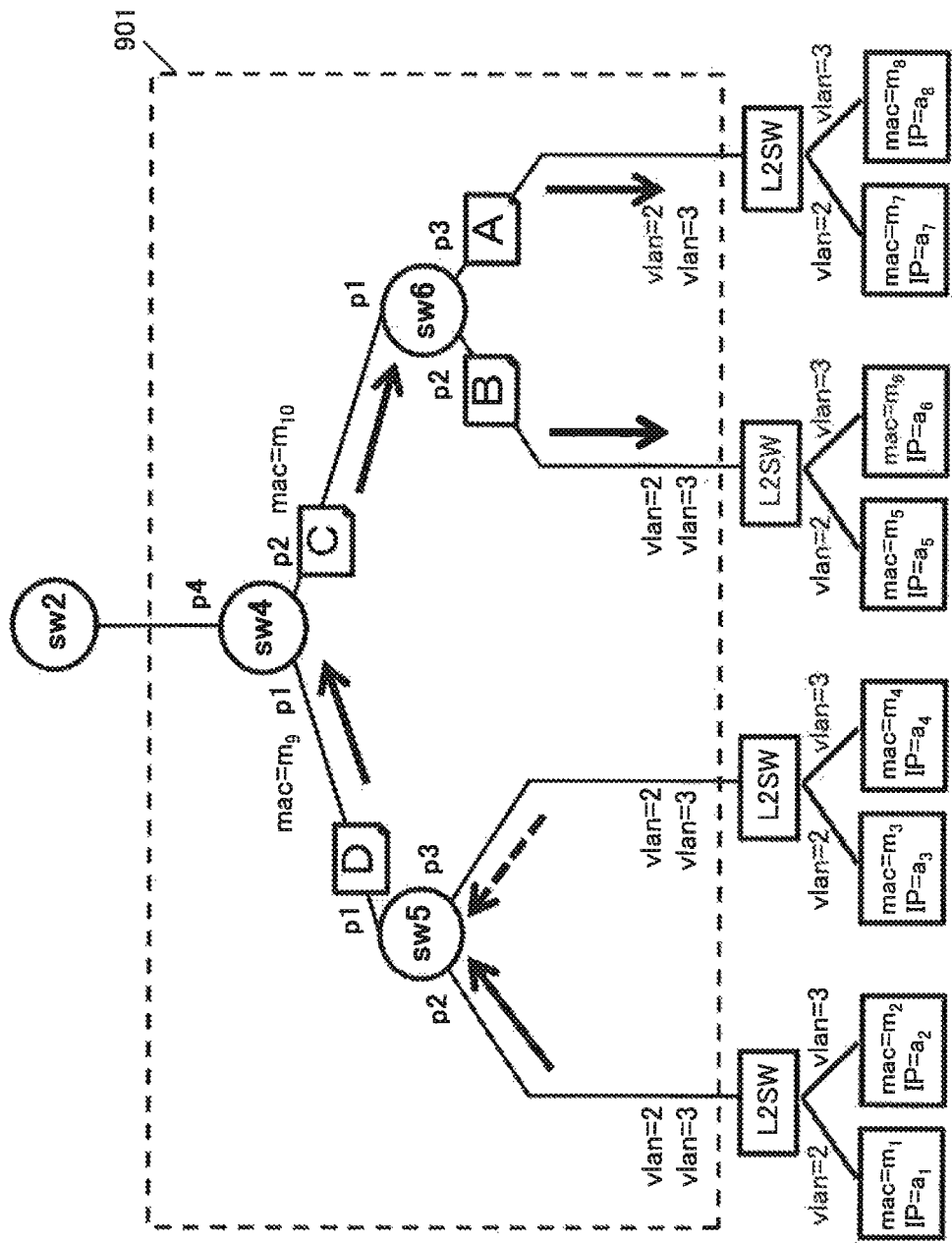
FIG. 11 is a schematic diagram illustrating a process to find an incoming packet pattern of another physical link path in the second example embodiment of the present invention.

This will be further explained by referring to FIG. 10 and FIG. 11. As shown in FIG. 10, in order to find incoming packet patterns at the sw5_p2, the network inspection apparatus 2 recursively executes the packet pattern calculation process in order along solid-line arrows. In that process, from the outgoing port toward the incoming port, the network inspection apparatus 2 registers packet patterns "A", "B", "C" and "D" at the individual output ports sequentially into the packet pattern cache. Furthermore, as shown in FIG. 11, in order to find incoming packet patterns at the sw5_p3, the network inspection apparatus 2 executes a packet pattern calculation process shown by an interrupted-line arrow. In that process, the network inspection apparatus 2, by reusing the packet pattern "D", is able to find the incoming packet patterns at the sw5_p3 without recursively executing the packet pattern calculation process.

Figure 12:
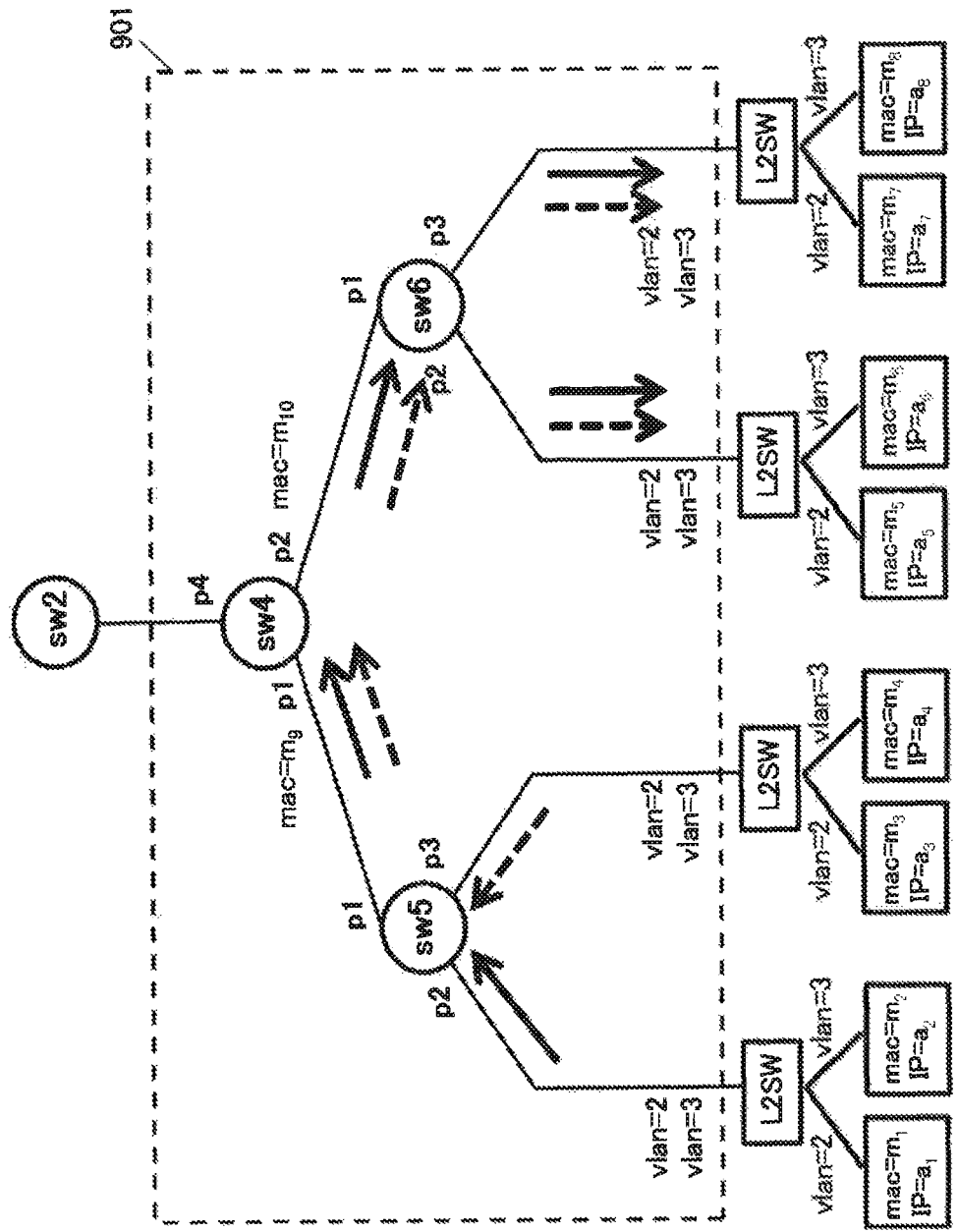
FIG. 12 is a schematic diagram illustrating a process to find an incoming packet pattern of a physical link path in a related technology.

On the other hand, in the case where the related technology mentioned in NPL 1 is employed, intermediate calculation result cannot be reused as stated above. This will be explained by referring to FIG. 12. In FIG. 12, the related technology mentioned in NPL 1, as indicated by solid-line arrows, searches the entire paths from the port sw5_p2 and then performs calculation backward from the outgoing port so as to find the incoming packet patterns at the port sw5_p2. In this case, if starting points are different, the packet patterns at outgoing ports are different and the packet patterns at intermediate ports calculated backward are also different. Therefore, a packet pattern at an intermediate port cannot be reused, between paths whose starting points are different. Therefore, in this related technology, even in the case finding incoming packet patterns at the sw5_p3 after incoming packet patterns at the port sw5_p2 being already found, it is required to search the entire paths from the port sw5_p3 and then performs calculation backward from the outgoing port, as indicated by interrupted-line arrows. Therefore, in the related technology mentioned in NPL 1, the time of inspection increases in comparison with the present example embodiment.

Figure 13:
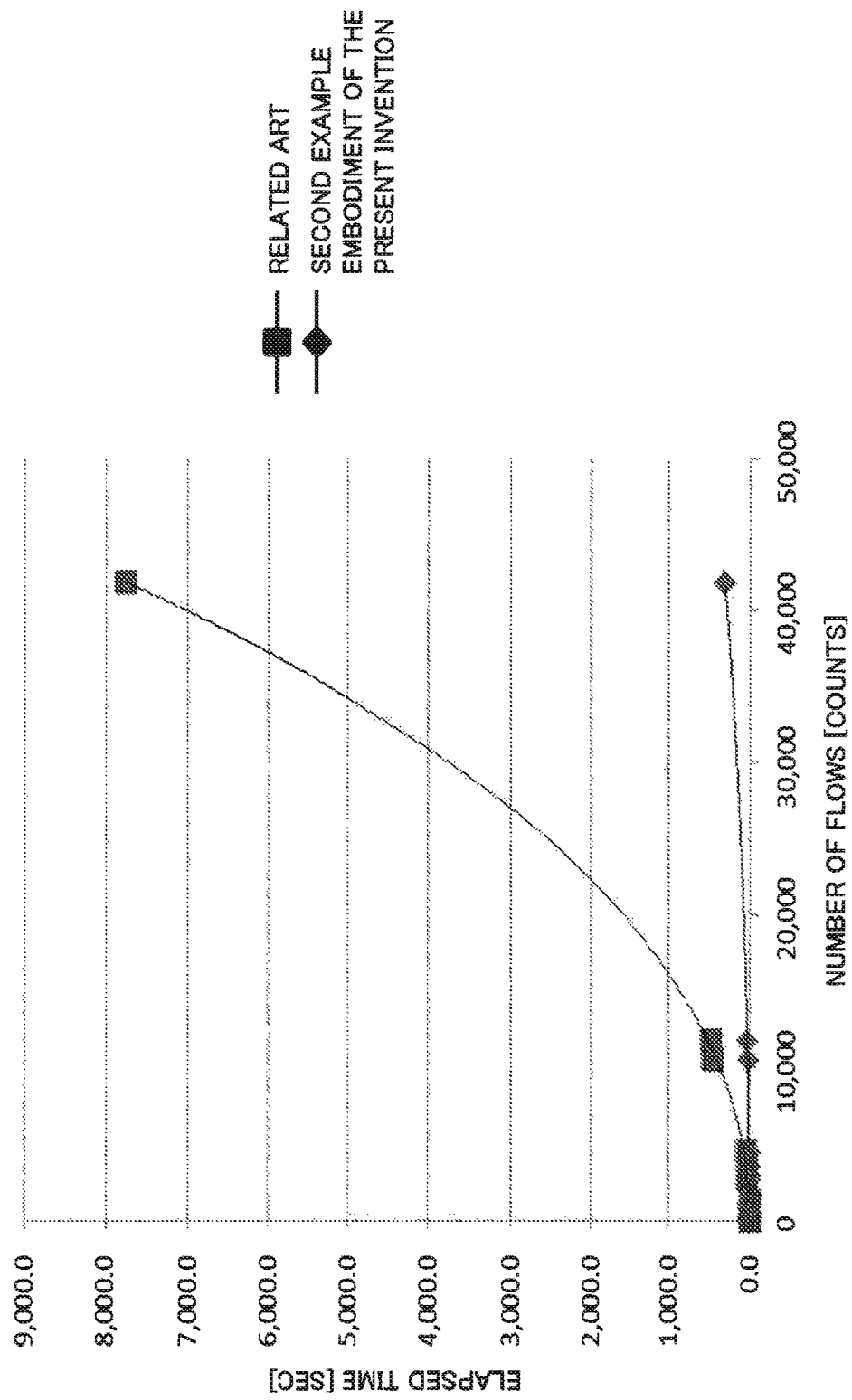
FIG. 13 is a graph showing a comparison about the times of inspection in the second example embodiment of the present invention and the related technology.

In the following, results of evaluation between the time of inspection in the case where a technology mentioned in NPL 1 is implemented on actual apparatus and the time of inspection in the case where the present example embodiment is implemented on actual apparatus, are shown in FIG. 13. In FIG. 13, the horizontal axis represents a total of flow entries of a group of switches within the inspection target network 901. The vertical axis represents the time required for inspection. According to FIG. 13, for about 40,000 flow entries, the related technology described in NPL 1 requires nearly 8,000 seconds for inspection, while the present example embodiment requires about 200 seconds as time needed for inspection. Thus the present example embodiment considerably reduces the time of inspection.

The operation of the second example embodiment of the present invention has been explained in detail as above.

In the following, advantageous effects of the second example embodiment of the present invention will be described.

The network inspection apparatus as the second example embodiment of the present invention is able to further reduce the processing time for calculating the incoming packet patterns with regard to a network.

A reason for that is because the backtrace function application unit recursively executes the packet pattern calculation process which outputs the packet pattern at the input port by applying a backtrace function to a packet pattern at an output port of a switch. It is also because, when the packet pattern at that output port is stored in the packet pattern cache, the backtrace function application unit reuses that the packet pattern. It is also because when the packet pattern at that output port is not stored in the packet pattern cache, the backtrace function application unit, in order to find that packet pattern, recursively executes the packet pattern calculation process using, as an input, the input port of the next switch which faces that output port. It is also because, in this case, the backtrace function application unit stores into the packet pattern cache the packet pattern obtained by the recursively executed packet pattern calculation process and then applies a backtrace function to the obtained packet pattern. It is also because when the transfer rule includes pieces of information that respectively represent the input port, the matching pattern, the action, and the output port, the backtrace function generation unit operates as follows. That is, it is because the backtrace function generation unit, using the packet pattern at the output port as an input, generates a backtrace function so as to output a packet pattern input to the input port, on the basis of the matching pattern and the action.

Due to this, the present example embodiment stores, in the packet pattern cache, results of intermediate calculation which are pairs of a packet pattern and an outgoing port in that case, for each output port on the physical link path. Description will be made with a certain physical link path "$p_1$", . . . , "$p_n$" as an example. Here, it is assumed that "$p_i$" (i=1 to n) represents the output ports of the switches $sw_i$ on the physical link path. Furthermore, it is assumed that each switch $sw_i$ includes a flow entry "$e_i$" that is applied to the physical link path. In this case, a result of calculation of packet patterns at the output port "$p_i$" by backtrace functions is represented as "$\zeta_{ei}$" . . . "$\zeta_{en}(\pi_T)$" depending only on a series of flow entries "$e_i$", . . . , "$e_n$" applied along the path from that output port "$p_i$" to the outgoing port "$p_n$".

Therefore, in the present example embodiment, when a packet pattern at an intermediate port "$p_i$" is stored in the packet pattern cache, the relevant value can be reused regardless of which incoming port the calculation is started. In this manner, in the present example embodiment, a pair of an outgoing port and a packet pattern calculated with regard to an intermediate port during calculation of a pair of a packet pattern from an incoming port and the outgoing port can be reused in calculation of a pair of a packet pattern from another incoming port and an outgoing port. In consequence, in the present example embodiment, it is enough to calculate a pair of a packet pattern and an outgoing port once with respect to the same port.

On the other hand, a case of finding the packet pattern by using the related technology described in NPL 1 will be described. In this related technology, first, assuming that the packet pattern at an incoming port is "$\pi_T$", a packet pattern "$(\phi_{en'} \cdot \cdot \cdot \phi_{ei} \cdot \cdot \cdot \phi_{e1})(\pi_T)$" at the outgoing port is calculated.

Note that "$\phi_{ei}$" represents a transfer function based on a flow entry "ei". And, in this related technology, a transfer inverse function is applied to the packet pattern at the outgoing port to find a packet pattern) "$(\phi^{-1}_{ei} \cdot \cdot \cdot \cdot \phi^{-1}_{en}) \cdot (\phi_{en} \cdot \cdot \cdot \phi_{ei} \cdot \cdot \cdot \phi_{e1})(\eta_T)$" at an intermediate output port "$p_i$". In this manner, it can be understood that in this related technology, the packet pattern at an intermediate output port "$p_i$" is affected by results of calculation performed from the incoming port "$p_1$" to the output port "$p_i$". Therefore, in the case of paths whose incoming ports are different, the cache cannot be reused.

In the following, advantageous effects of the aforementioned present example embodiment will be described by using a schematic inspection target network shown in FIG. 14 and FIG. 15.

Figure 14:
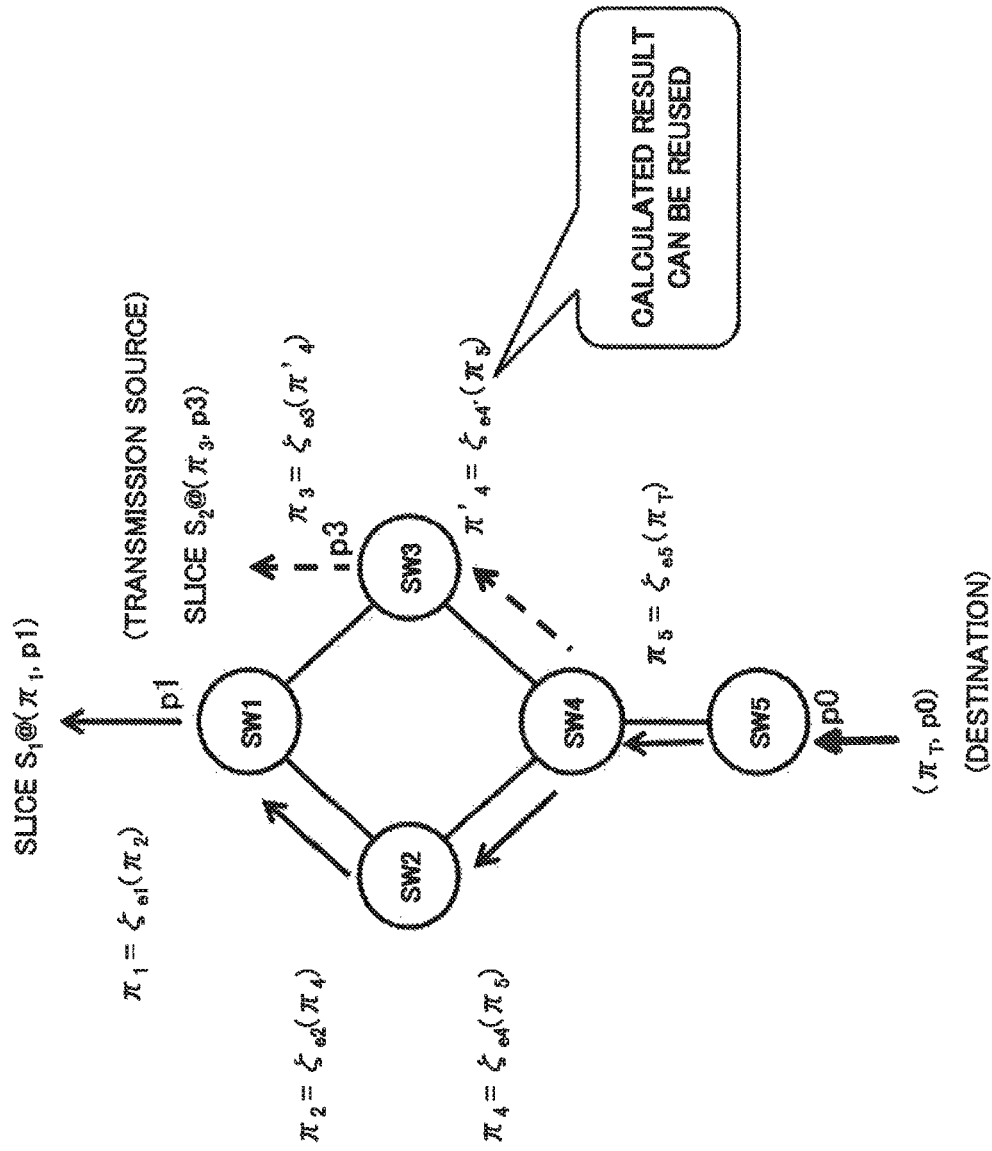
FIG. 14 is a schematic diagram for describing advantageous effects of the second example embodiment of the present invention.
Figure 15:
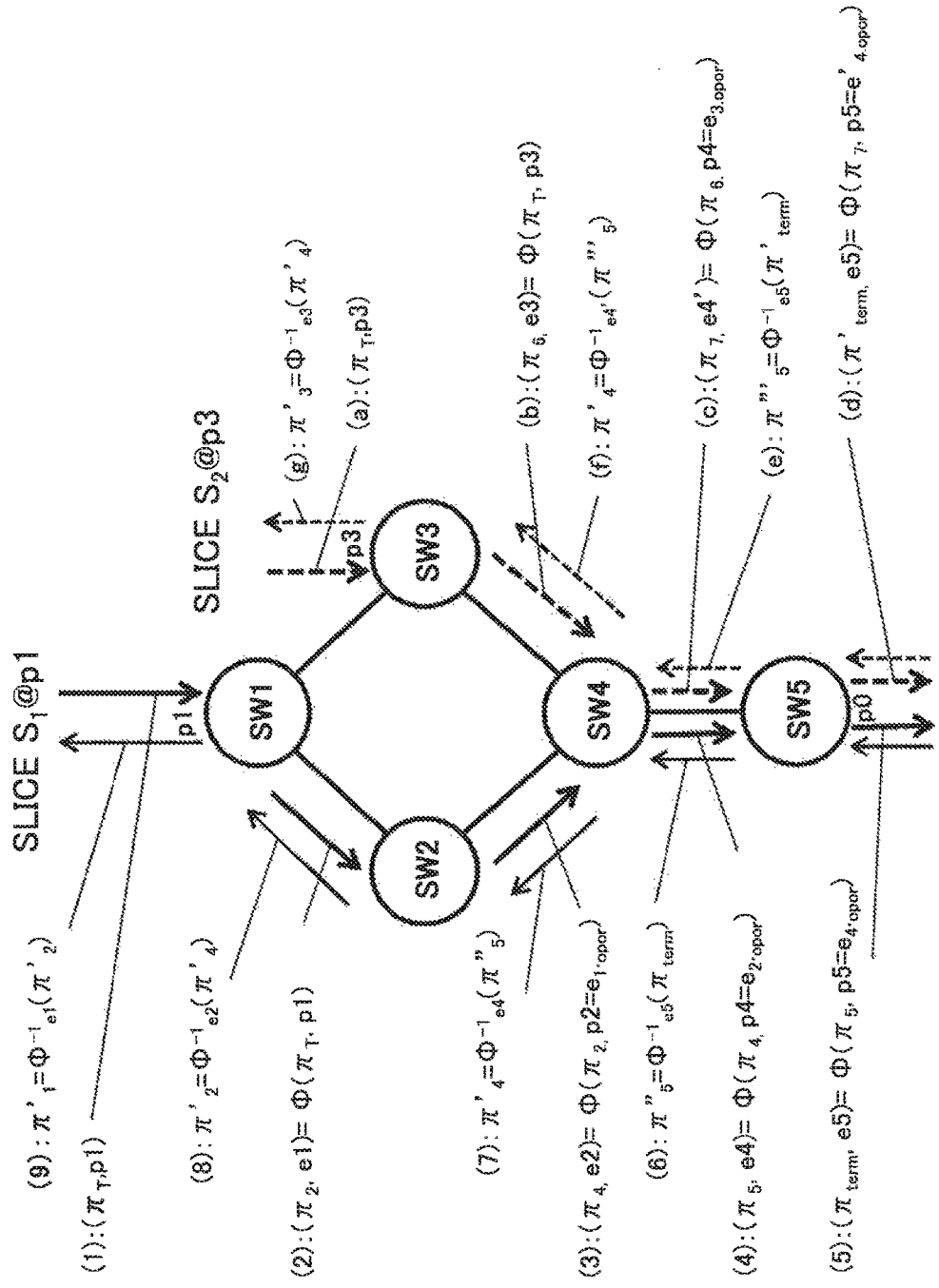
FIG. 15 is a schematic diagram for describing a related technology.

First, using FIG. 14, a process of finding an incoming packet pattern in the present example embodiment will be generally described. In FIG. 14, an inspection target network is constituted by five switches sw1, sw2, sw3, sw4, and sw5. This inspection target network has two physical link paths. A first physical link path is a path from an incoming port, which is a port p1 of the sw1, to an outgoing port, which is a port p0 of the sw5, via the sw2 and the sw4. It is assumed that the flow entries at the sw1, sw2, sw4, and sw5 which are applied on this path are "e1", "e2", "e4", and "e5", respectively, and that the backtrace function based on these are "$\zeta_{e1}$", "$\zeta_{e2}$", "$\zeta_{e4}$", and "$\zeta_{e5}$". The second physical link path is a path that extends from an incoming port, which is a port p3 of the sw3, to an outgoing port, which is the port p0 of the sw5, via the sw4. It is assumed that the flow entries at sw3, sw4, and sw5 which are applied on this path are "e3", "e4'", and "e5", respectively, and that the backtrace functions based on these are "$\zeta_{e3}$", "$\zeta_{e4'}$", and "$\zeta_{e5}$".

In this case, it is assumed that the present example embodiment finds an incoming packet pattern at the incoming port "p1" on the first physical link path, at first. In this case, the packet patterns at the output ports of the intermediate sw1, sw2, and sw4 are not stored in the packet pattern cache yet. Therefore, the present example embodiment finds the packet pattern "$\pi_5 = \zeta_{e5}(\pi_T)$" at the input port of the sw5, with use of the "$\pi_T$" which is packet pattern cache from the outgoing port "p0" of the sw5. The present example embodiment associates the calculated packet pattern with the output port of the sw4, and stores in the packet pattern cache. Likewise, the present example embodiment finds the packet pattern "$\pi_4 = \zeta_{e4}(\pi_5)$" at the input port of the sw4 on this physical link path, associates with the output port of the sw2, and stores in the packet pattern cache. Likewise, the present example embodiment finds the packet pattern "$\pi_2 = \zeta_{e2}(\pi_4)$" at the input port of the sw2, associates with the output port of the sw1 on this physical link path, and stores in the packet pattern cache. Then, the present example embodiment is able to find the packet pattern "$\pi_1 = \zeta_{e1}(\pi_2)$" at the input port of the sw1, that is, at the incoming port p1. In FIG. 14, "slice $S_1@(\pi_1, p1)$" represents that the packet of a packet pattern "$\pi_1$" belonging to a slice (i.e., virtual network) "$S_1$" is allowed to flow into the port "p1" in the inspection target network. That is, such an incoming packet pattern "$\pi_1$" has been found. Solid-line arrows in FIG. 14 indicate the processing order of backtrace functions when the present example embodiment finds an incoming packet pattern at the incoming port p1 on the first physical link path.

In FIG. 14, it is assumed that, the present example embodiment, next, finds an incoming packet pattern at an incoming port p3 on the second physical link path. In this case, the packet pattern cache stores a packet pattern "$\pi_5 = \zeta_{e5}(\pi_T)$" regarding the output port of the sw4, which is an intermediate port on the physical link path. The present example embodiment obtains the "$\pi_5 = \zeta_{e5}(\pi_T)$" from the packet pattern cache and reuses that. Then, the present example embodiment finds the packet pattern "$\pi'_4 = \zeta_{e4}'(\pi_5)$" at the input port of the sw4 on this physical link path, associates that with the output port of the sw3, and stores in the packet pattern cache. Therefore, the present example embodiment can find the packet pattern "$\pi_3 = \zeta_{e3}(\pi'_4)$" at the input port of the sw3, that is, the incoming port p3. In FIG. 14, "slice $S_2@(\pi_3, p3)$" represents that the packet of a packet pattern "$\pi_3$" belonging to a slice "$S_2$" is allowed to flow into the port "p3" in the inspection target network. That is, such an incoming packet pattern "$\pi_3$" has been found. Furthermore, interrupted-line arrows in FIG. 14 indicate the processing order of the backtrace functions when the present example embodiment determines the incoming packet pattern at the incoming port "p3" on the second physical link path.

In the following, for comparison, a process for finding a packet pattern at an incoming port of the inspection target network shown in FIG. 14 by using the related technology mentioned in NPL 1 will be typically explained by referring to FIG. 15. In FIG. 15, "slice $S_1@p1$" represents that a packet pattern that belongs to a slice "$S_1$" is allowed to flow into an incoming port "p1". In this case, the related technology first finds the packet pattern "$(\pi_2, e1) = \phi(\pi_T, p1)$" at the output port of the sw1, with "$\pi_T$" as the packet pattern at an incoming port "p0" on the first physical link path. The packet pattern "$(\pi_2, e1) = \phi(\pi_T, p1)$" represents that a result of applying of the transfer function "$\phi$" to the packet pattern "$\pi_T$" being input to the port "p1", is a packet pattern "$\pi_2$" which is based on a flow entry "e1". Likewise, by sequentially applying the transfer functions "$\phi$", this related technology finds the packet pattern "$(\pi_{term}, e5) = \phi(\pi_5, p5 = e_{4 \cdot opor})$" at an outgoing port "p0" on the first physical link path. The expression "$pi = e_{j \cdot opor}$" represents that the port "pi" faces the output port determined by a flow entry "ej". And this related technology applies a transfer inverse function to the determined outgoing packet pattern "$\pi_{term}$" to find the packet pattern "$\pi''_5 = \Phi^{-1}_{e5}(\pi_{term})$" at the input port of the sw5. And the related technology, by sequentially applying the transfer inverse functions, can find the incoming packet pattern "$\pi'_1 = \phi^{-1}_{e1}(\pi'_2)$" at the incoming port "p1". In FIG. 15, (1) to (9) indicate the order in which the transfer functions and the transfer inverse function are applied during calculation of the incoming packet pattern of the first physical link path.

In the following, finding of an incoming packet pattern of the second physical link path by this related technology will be considered. In FIG. 15, "slice $S_2@p3$" represents that a packet pattern that belongs to a slice "$S_2$" is sent to an incoming port "p3". In this case, this related technology, first, sequentially applies transfer functions "$\phi$" to find the packet pattern "$(\pi'_{term}, e5) = \phi(\pi_7, p5 = e_4'._{opor})$" at an outgoing port "p0" of this physical link path, while "$\pi_T$" represents the packet pattern at the incoming port p3. This related technology applies a transfer inverse function to the determined outgoing packet pattern "$\pi'_{term}$". In this case, the packet pattern at the input port of the sw5 is "$\pi'''_5 = ^{-1}_{e5}(\pi'_{term})$", which is different from the packet pattern "$\pi''_5 = ^{-1}_{e5}(\pi_{term})$" at the input port of the sw5 determined by the transfer inverse function with respect to the first physical link path. In this manner, in this related technology, even when a packet pattern has been calculated with respect to the same intermediate port on another physical link path, the value thereof cannot be reused at the time of applying a transfer inverse function. In FIG. 15, (a) to (g) indicate the order in which the transfer functions and the transfer inverse functions are applied during calculation of an incoming packet pattern of the second physical link path.

As described above by using FIG. 14 and FIG. 15, the present example embodiment, compared with the related technology mentioned in NPL 1, is able to reduce considerably the processing time for calculating incoming packet patterns with regard to a network.

In the second example embodiment of the present invention, the processing in which the backtrace function application unit recursively executes processing of applying backtrace functions was mainly described. The backtrace function application unit in the present invention is not limited to the processing as described above, and may employ another processing when applying backtrace functions from the outgoing port toward the incoming port of a physical link path. Such another process procedure may be a procedure for reusing an already calculated packet pattern cache with respect to an intermediate port, if such a cache is stored, to apply backtrace functions from that intermediate port toward the incoming port.

Furthermore, in the second example embodiment of the present invention, an example of the format of information stored in the packet pattern cache was shown in drawings for explanation. Besides that format, the information stored in the packet pattern cache may be represented in another format as long as the another format is able to represent the packet pattern at an intermediate port and the outgoing port which the packet pattern reaches from that intermediate port.

In each example embodiment of the present invention described above, the network inspection apparatus need not to be connected to the inspection target network, and it is sufficient for the network inspection apparatus to be able to acquire the physical network topology information thereabout and the transfer rules from a storage apparatus, an input apparatus, and the like.

In each example embodiment of the present invention described above, the example, in which various functional blocks of the network inspection apparatus are realized by the CPU that executes computer programs stored in the storage apparatus or the ROM, was mainly described. The network inspection apparatus is not limited to this, but part or the whole of each functional block or a combination thereof may be realized by dedicated hardware.

Furthermore, in each example embodiment of the present invention described above, the functional blocks of the network inspection apparatus may be realized by distributed apparatuses.

In each example embodiment of the present invention described above, the operations of the network inspection apparatus described with reference to the flowcharts may be stored as a computer program with regard to the present invention, in the storage apparatus (storage medium) of a computer apparatus. The CPU of that computer apparatus may read and execute such a computer program. In such a case, the present invention is constituted by codes of the above described computer program or a storage medium thereof.

The present invention has been described by use of the aforementioned example embodiments as typical examples. However, the present invention is not limited to the aforementioned example embodiments. That is, in the present invention, various variations understandable by a person with ordinary skill in the art can be applied within the scope of the present invention.

This application claims the right of priority based on Japanese Patent Application No. 2014-150077 filed Jul. 23, 2014 and the entire disclosure thereof is incorporated herein.

REFERENCE SIGNS LIST 1, 2 Network inspection apparatus
11 Inspection target network information acquisition unit
12, 22 Backtrace function generation unit
13, 23 Physical link path acquisition unit
14, 24 Backtrace function application unit
15 Inspection result output unit
900, 901 Inspection target network
1001 CPU
1002 RAM
1003 ROM
1004 Storage apparatus
1005 Network interface
1006 Display apparatus

What is claimed is:

1. A network inspection apparatus comprising a processing circuitry and a memory, the processing circuitry being configured to:
acquire a transfer rule for a packet at each switch in an inspection target network and physical network topology information about the inspection target network;
generate, based on the transfer rule, a backtrace function that calculates backward, from a packet pattern of a packet that is output from a port of the switch, a packet pattern of a packet that is input to a port, being corresponding to the port from which a packet is output, of the switch;
acquire, based on the physical network topology information and the transfer rule, a physical link path that represents a series of ports that links an incoming port of the switch to an outgoing port of the switch, the incoming port being a port of the switch through which a packet being transferred from an external network flows into the inspection target network, the outgoing port being a port of the switch from which a packet being transferred from the inspection target network to an external network flows out;
calculate a packet pattern at the incoming port of a packet that reaches the outgoing port, by sequentially applying the backtrace function from the outgoing port toward the incoming port, while using a packet pattern cache that stores, in the memory, a packet pattern at an intermediate port on the physical link path of the packet that reaches the outgoing port from the intermediate port; and
provide the packet pattern at the incoming port being calculated.

2. The network inspection apparatus according to claim 1, wherein the processing circuitry further being configured to:
when executing a packet pattern calculation processing, which includes
accepting, as an input, information that represents an input port of the switch, and providing information that represents a packet pattern at the input port, by applying the backtrace function to a packet pattern of a packet being able to reach the outgoing port from an output port corresponding to the input port in the switch, at the output port,
reuse the packet pattern at the output port of the packet that reaches the outgoing port from the output port, when the packet pattern at the output port of the packet is stored in the packet pattern cache, and
recursively execute, in order to determine the packet pattern, the packet pattern calculation processing, by accepting, as input, information representing an input port of a next one of switches which faces the output port, and stores the packet pattern being provided by the packet pattern calculation processing into the packet pattern cache, when the packet pattern is not stored in the packet pattern cache.

3. The network inspection apparatus according to claim 2, wherein the processing circuitry further being configured to:
when the transfer rule includes information representing an input port, information representing a condition (matching pattern) to which the packet pattern input to the input port conforms, information representing a processing content (action) for the packet pattern when the packet pattern conforms to the condition, and information representing an output port that outputs a packet pattern on which processing of the action being performed,
generate the backtrace function so that the backtrace function outputs a packet pattern that is input to the input port, based on the matching pattern and the action, by using the packet pattern at the output port as an input.

4. A network inspection method comprising:
acquiring a transfer rule regarding a packet at each switch in an inspection target network and physical network topology information about the inspection target network;
generating, based on the transfer rule, a backtrace function that calculates backward, from a packet pattern of a packet that is output from a port of the switch, a packet pattern of a packet that is input to a port, corresponding to the port from which a packet is output, of the switch;
acquiring, based on the physical network topology information and the transfer rule, a physical link path that represents a series of ports that links an incoming port of the switch to an outgoing port of the switch, the incoming port being a port of the switch through which a packet being transferred from an external network flows into the inspection target network, the outgoing port being a port of the switch from which a packet being transferred from the inspection target network to an external network flows out;
calculating a packet pattern at the incoming port of a packet that reaches the outgoing port, by sequentially applying the backtrace function from the outgoing port toward the incoming port while using a packet pattern cache that stores a packet pattern at an intermediate port on the physical link path of the packet that reaches the outgoing port from the intermediate port; and
providing the packet pattern at the incoming port of the packet that reaches the outgoing port.

5. A non-transitory computer readable storage medium storing a network inspection program that causes a computer apparatus to execute:
processing for acquiring a transfer rule regarding a packet at each switch in an inspection target network and physical network topology information about the inspection target network;
processing for generating, based on the transfer rule, a backtrace function that calculates backward, from a packet pattern of a packet that is output from a port of the switch, a packet pattern of a packet that is input to a port corresponding to the port from which a packet is output, of the switch;

processing for acquiring, based on the physical network topology information and the transfer rule, a physical link path that represents a series of ports that links an incoming port of the switch to an outgoing port of the switch, the incoming port being a port of the switch through which a packet being transferred from an external network flows into the inspection target network, the outgoing port being a port of a switch from which a packet being transferred from the inspection target network to an external flows out;

processing for calculating a packet pattern at the incoming port of a packet that reaches the outgoing port, by sequentially applying the backtrace function from the outgoing port toward the incoming port while using a packet pattern cache that stores a packet pattern at an intermediate port on the physical link path of the packet that reaches the outgoing port from the intermediate port; and processing for providing the packet pattern at the incoming port being calculated.

* * * * *